United States Patent

[11] 3,582,901

[72] Inventors Frederick P. Cochrane
Woodstock;
James D. Russell, Claverack, both of N.Y.

[21] Appl. No. 764,144
[22] Filed Oct. 1, 1968
[45] Patented June 1, 1971
[73] Assignee International Business Machines Corporation
Armonk, N.Y.

[54] RANDOM DATA ACQUISITION INTERFACE SYSTEM
33 Claims, 18 Drawing Figs.

[52] U.S. Cl. .......... 340/172.5
[51] Int. Cl. .......... G06f 3/00
[50] Field of Search .......... 340/172.5; 235/157

[56] References Cited

UNITED STATES PATENTS

| | | | |
|---|---|---|---|
| 3,200,192 | 8/1965 | Auwaerter et al. | 340/172.5X |
| 3,208,048 | 9/1965 | Kilburn et al. | 340/172.5 |
| 3,333,252 | 7/1967 | Shimabukuro | 340/172.5 |

*Primary Examiner*—Raulfe B. Zache
*Attorneys*—Hanifin and Jancin and Edwin Lester ABSTRACT: A data acquisition interface system for translating real-time randomly occurring complex input signals into data processing usable form for transmission to an online data processing system. The system includes a plurality of interchangeable data acquisition components of the monitor register, scaler/timer and analogue to digital converter type which are activated by external means for gathering data, counting inputs, measuring time and making analogue to digital conversions and an interface control unit for organizing the data transfer from the components to the data processing system. The occurrence of an input signal, the time coincidence of two or more input signals or the presence and absence of input signals or the like are termed events. In response to the occurrence of an event, the interface control unit initiates a sequential component data transfer from the components associated with the event preceded by a word identifying the event. Events are processed in numerical sequence, but processing may be selectively modified to permit processing in priority sequence. Events may be programmed to exclude other events which share a common component.

INVENTORS
FREDERICK P. COCHRANE
JAMES D. RUSSELL

BY Edwin Lester
ATTORNEY

RANDOM DATA ACQUISITION INTERFACE SYSTEM

TABLE OF CONTENTS

| Title of section | Page No. |
|---|---|
| Background of invention: | |
| 1. Field of invention | 1 |
| 2. Description of prior art | 2 |
| Brief summary of the invention | 4 |
| Brief description of the drawings | 14 |
| Description of the preferred embodiment: | |
| 1. General organization | 16 |
| 2. General description of the overall interface system operation | 18 |
| 3. Description of symbolic logic used in the system | 20 |
| 4. Detailed description of the functional units of the interface control unit | 23 |
| 5. Detailed description of the data acquisition components | 48 |
| 6. Detailed description of a representative system application | 68 |
| 7. Detailed description of system configuration operations | 80 |

BACKGROUND OF THE INVENTION

1. Field of the Invention

This invention relates generally to data handling systems, and more particularly to a random data acquisition interface system. The invention described herein was made in the course of, or under, a subcontract pursuant to a contract with the U.S. Atomic Energy Commission.

2. Description of the Prior Art

Data Processing Systems are finding increasing application in such fields as industrial process control, traffic control, communications, satellite data telemetry, rocket engine testing, nuclear reactors, physics experimentation, chemical process plants, medical research, etc. Such applications frequently require translating real-time occurring complex input signals, developed by instrumentation connected to input sensors or transducers, into data processing usable form and communicating the resultant data rapidly to an online data processing system. The system for accomplishing this function and providing the interface between the instrumentation and data processing system is termed a data acquisition interface system and consists of data acquisition components for measuring the signals developed by the instrumentation and an interface control unit for organizing data from the components for transfer in a meaningful sequence to the data processing system.

Input signals to the system may be of a continuous nature resulting in a flow of data to the data processing system at a fixed and regular data rate thereby allowing the input lines to be sampled sequentially at a predetermined rate. However, in many applications, the input signals do not occur at a fixed rate but rather at random frequency and with no fixed timing relationship to one another. Consequently, fixed periodic transfer of data to the data processing system using conventional multiplex scan techniques is usually not practical. Also, depending upon the system application, the user may desire to transfer data for every occurrence of an input signal, upon the time coincidence of one or more input signals and the absence of one or more other input signals or any other permutation and combination of the input signals. Such occurrences may be termed events each requiring data acquisition from one or more data acquisition components associated with the event. Since event signals may be related to input signals which occur at random frequency or in random time coincidence combinations, the event signals also will occur at random frequency and may have no fixed timing-relationship to one another. Further, the system application may involve several events each requiring the use of a different set of data acquisition components. For example, in low energy nuclear physics experiments, the detection of an emitted proton may be defined as an event requiring the use of an analogue to digital converter to measure proton energy; the detection of a proton in time coincidence with a gamma ray may define another event requiring the use of two analogue to digital converters to measure proton and gamma energy, respectively, and require the use of a timer to measure the time between occurrences of these combinations. Thus, many possible events and associated combinations of data acquisition components are possible.

One method for controlling the transfer of data in this situation is to let each data acquisition component signal the data processing system when data is available by means of an interrupt signal. The data processing system responds to the interrupt signals from the different components on a first come first served basis. The data is identified either by the specific interrupt line involved or by an identification word transferred with each data word. The data processing system has the further task of sorting the data in accordance with the identification word and compiling associated data words into blocks of meaningful information. However, this method would cause frequent interruption of the main processor program, considerable amount of program data sorting because of the arrival of data in a random rather than fixed sequence, inefficient data transfers due to the addition of identifying information to each word transferred and lengthy waiting time between the availability of data and its transfer to the data processing system.

If input signals or combinations of the presence and/or absence of input signals are combined into events with each event defining a fixed order of component selection, then, the event signal may be used as the interrupt signal to the data processing system. The data processing system would respond to the event signals on a first come first served basis and program branch to event subroutines for sampling data from the data acquisition components in a fixed predetermined sequence. This arrangement would minimize the amount of program data sorting and inefficient data transfers but would not eliminate the high interrupt rate to the data processing system or lengthy waiting time between availability of the event data and its transfer to the main data processing system.

BRIEF SUMMARY OF THE INVENTION

By means of the present invention a variable number of interchangeable data acquisition components are provided for monitoring randomly occurring input signals from a large variety of sources. The input signals, combinations of the presence and/or absence of input signals or the occurrence of predetermined conditions resulting from the random input signals or random time coincidence combinations are combined into event signals defining those components which are to be associated with the event in a data gathering configuration. An interface control unit is provided for responding to the event signals to create an event identification word and then sample all of the components associated with the event in a predetermined sequence. The system may be connected to a data adapter unit which functions as a buffer between the system and the data processor. As a result, data may be transferred between the system and the adapter unit on a demand-response basis for subsequent transfer from the adapter unit to the main storage of the data processor. Consequently, a feature of the present invention is that data transferred from the system is automatically identified and sorted without any interruption of the data processor.

In one embodiment of the present invention interchangeable data acquisition components are provided. Any number of the components, up to the maximum, may be associated with an event and each component may be shared by any or all events, An event register is provided for registering the occurrence of event signals. If no event is currently being processed, all event signals which occurred during a previous time period will be passed as an event group to the event scan latches of an event scanner. An event exclusion selector is provided responsive to the occurrence of an event signal to inhibit the event register from responding to subsequently occurring events which share components with the current event thereby rejecting such subsequently occurring events. After the current event has been completely serviced, the inhibition is removed and the event register may then respond to such events which may subsequently occur. Priority control circuits are provided in the event scanner to ensure that the event group is always processed in an ascending numerical sequence, beginning with lowest numbered event which is given the highest priority, without regard to the sequence in which the event signals are received by the system. When the scan period is completed, the event latches are inhibited from responding to any further event signals and only one select event signal is active corresponding to the highest priority event of the event group. When the components associated with the current event have been sampled, the processing of the event is completed and the next sequential select event signal is rendered active corresponding to the next highest priority event of the event group, etc. An event identification encoder is also provided for encoding each of the select event signals into a binary value corresponding to and identifying the selected event. A component and tag selector is provided, responsive to the select event signals, to designate by select component signals those of the data acquisition components associated with the current event to be sampled for data. The selector also selectively signals an immediate interruption to the data processing system so that the current event may be processed as soon as the data transfer for the event has terminated rather than waiting until the processor buffer area is filled. A component scanner is associated with the component selector for latching those select component signals associated with the current event. Priority control circuits are also provided in the component scanner similar to that in the event scanner to ensure that the components associated with the current event are always sampled in an ascending numerical sequence beginning with the lowest numbered associated component. A component interface is provided between the data acquisition components and the data adapter unit of the data processing system. Prior to sampling the data acquisition components, the component scanner selectively issues an event identification request signal to initiate the formation of an identification word in the component interface, which includes the event identification value, and to cause the component interface to issue a demand signal to the adapter unit of the data processing system indicating that the event identification word is now ready for data transfer. The data processing system accepts the word after which a response is issued indicating the system is ready to read data from the first data acquisition component associated with the current event. The sampling of the first data acquisition component is next initiated, at the end of which the component issues a transfer request signal to initiate the formation of a component data word in the component interface, which includes the value generated by the component, and to cause the component interface to again issue a demand signal to the adapter unit of the data processing system. In a similar manner, successive components associated with the current event are sampled in ascending numerical sequence to transfer a block of information corresponding to the current event to the data processing system. A scan control unit is provided for generating control signals for the event and component scanner. Initially, the scan control unit conditions the event scanner to respond to event signals which occurred during a previous scan time after which the control unit inhibits the event scanner from responding to any further event signals. At the end of the scan time, the control unit initiates a stabilizer time period to allow for event and component signal stabilization after which the control unit permits the select component signals associated with the current event to be latched in the component scanner. When data from the component being currently sampled is transferred to the data processing system, the demand signal indicative of this occurrence is applied to the control unit to reset the current component latch and initiate the transfer of the next component data word. When the component scanner has serviced all the components associated with the current event, the control unit responds to this condition to reset the current event latch and allow the next active sequential select event signal to initiate the transfer of the next block of information. Selective priority control is provided in the scan control unit to permit the transfer of additional events to the event group in the event scanner immediately upon completion of the current event so that it is unnecessary for a lower numbered event to await completion of a previous event group latched in the event scanner. The effect of this priority control is to selectively allow servicing of an event group only after a previous event group has been completely serviced or to continuously allow highest priority servicing of the lowest numbered events.

The interchangeable data acquisition components used in the present invention include a monitor register component, a scaler/timer component and an analogue to digital conversion (ADC) component. The monitor register component provides storage for input data until transferred to the data processing system. The register is selectively operated to be reset after each transfer or to accumulate data until manually or externally reset. The component is also selectively operated in four modes each defining an active gate interval during which data is stored in the register for transfer to the data processing system. The scaler/timer component provides a counter for counting externally received input signals or measuring a time interval by counting input signals from an external oscillator. Like the monitor register, the scaler/timer component is selectively operated to be reset after each transfer or to accumulate data and can similarly operate in four modes defining an active gate interval. A feature of the scaler/time component is the provision of an overflow selector which permits the user to select the count at which overflow will occur. Overflow enables the user to extend the range of the counter or to use the counter overflow to trigger an event and/or another component.

The ADC component measures the peak amplitude of an analogue signal and with the use of a binary counter converts the measurement into a binary number for transfer to the data processing system. The ADC component is selectively operated in a fixed time mode or a variable time mode proportional to the amplitude of the input signal. The counter of the ADC component is selectively reset after each data transfer, manually or by an external signal. The ADC component produces a dead time signal having a period initiated from the start of a data conversion and terminated when the converted data is transferred to the data processing system. The ADC component also includes a blanking control which is activated when a data conversion is initiated to inhibit the component from responding to further input signals while a data conversion is in process. The blanking control may also be activated by external means such as the dead time signal of another ADC component associated with the first ADC component in an event and shared with any or all other events. In such case, mutual blanking is achieved by commonly connecting the blanking controls and the dead time outputs of all shared ADC components so that all such components are inhibited from responding to further input signals while any of the mutual components are performing a data conversion.

Accordingly, it is a primary object of this invention to provide a random data handling system.

Another object of the invention is to provide a data acquisition interface system which responds to events which occur at random frequency.

Still another object of the invention is to provide a data acquisition interface system which responds to simultaneously occurring events on a predetermined priority basis.

A further object of the invention is to provide a data acquisition interface system which monitors later occurring events while processing a current event.

A still further object of the invention is the provision of a data acquisition interface system which when processing a current event monitors later occurring events and subsequently processes such events on a predetermined priority basis regardless of the order in which such events occur.

Another object of the invention is the provision of a data acquisition interface system which monitors later occurring events while processing a first group of events.

Still another object of the invention is to provide a data acquisition interface system which when processing a first group of events monitors later occurring events and subsequently processes such events only after the first group has been processed.

A further object of the invention is the provision of a data acquisition interface system which when processing one of a first group of events monitors a higher priority event which occurs later than any of the first group and selectively processes such later occurring event before lower priority ones of the first group of events are processed.

A still further object of the invention is to provide a data acquisition interface system which when processing one of a first group of events monitors a second group of events which occur later than any of the first group and selectively processes the first and second group on a predetermined priority basis.

Another object of the invention is the provision of a data acquisition interface system for use with a predetermined number of data acquisition components selectively associated with different occurring events.

Still another object of the invention is the provision of a data acquisition interface system for monitoring ADC–A occurring events and selecting predetermined groups of data acquisition components associated ADC–A the events for data transfer.

A further object of the invention is to provide a data acquisition interface system responsive to random occurring events for transferring data from selective data acquisition components in predetermined order and preceded by a data word identifying the event.

Another object of the invention is the provision of a data acquisition interface system for use with different occurring events having predetermined numbers of data acquisition components associated with the events so arranged that any or all of the components associated with a given event can be shared among any number of events.

Still another object of the invention is to provide a data acquisition interface system for use with a group of data acquisition components selectively shared with different occurring events and where the occurrence of a given event can inhibit any other event or combination of events which share the components associated with the given event.

A further object of the invention is the provision of a data acquisition interface system for use with different occurring events having groups of data acquisition components monitoring input signals associated with the events so arranged that components independent of those involved in a given event may continue to respond to input signals while those involved in the given event are being processed.

A still further object of the invention is to provide a data acquisition interface system for controlling the transfer of data associated with the occurrence of different events to a data processing system and selectively signalling an immediate interruption of the data processing system for predetermined events.

Another object of the invention is the provision of a data acquisition system for use with data acquisition components of a type which monitors input data selectively for an active gate interval and is selectively reset after each data transfer or permitted to accumulate data until manually or externally reset.

Still another object of the invention is to provide a data acquisition component of a type which selectively counts input signals or measures a time interval by counting input signals from an external oscillator.

A further object of the invention is the provision of a data acquisition system for use with data acquisition components of a type which is selectively operable as a scaler or timer each further selective for an active gate interval and also selectively reset after each data transfer or permitted to accumulate data until manually or externally reset.

A still further object of the invention is to provide a data acquisition system for use with data acquisition components of a type which is selectively operable as a scaler or timer and providing overflow control.

Another object of the invention is the provision of a data acquisition system for use with data acquisition components of a type which measures the peak amplitude of analogue signals selectively in a fixed or variable time period and converts the measurement to a digital value representative of the peak amplitude.

Still another object of the invention is to provide a data acquisition system for use with data acquisition components of the analogue to digital conversion type which includes control means to inhibit the component from responding to further input signals while a data conversion is in process.

A further object of the invention is the provision of a data acquisition system for use with data acquisition components of the analogue to digital conversion type which includes control means which, when the component is shared by any or all events and is used with other shared analogue to digital components, is operable under control of the other shared analogue to digital components to inhibit the component from responding to further input signals while any of the mutual components are performing a data conversion or waiting to transfer data.

The foregoing and other objects, features and advantages of the invention will be apparent from the following more particular description of a preferred embodiment of the invention, as illustrated in the accompanying drawings.

DESCRIPTION OF THE PREFERRED EMBODIMENT

1. General organization

To facilitate the understanding of the invention, resort has been had to three levels of drawings. The first level shows in simplified block form the general arrangement and interconnections of the major components comprising a data acquisition system and also serves as an index to the next lower level of the drawings. The second level is a block diagram showing a breakdown, in logical block form, of the major components of the random data acquisition interface system of the present invention and the interconnections between the logical block diagrams of each major component as well as the intraconnections between the logical block diagrams in each major component. This second level also serves as an index to the next lower level of the drawings. The third level is a composite block diagram showing, in symbolic block form, the breakdown of the logical block diagrams in each of the major components of the random data interface system including the inter and intraconnections between logical block diagrams.

Figures 1, 2, 3:
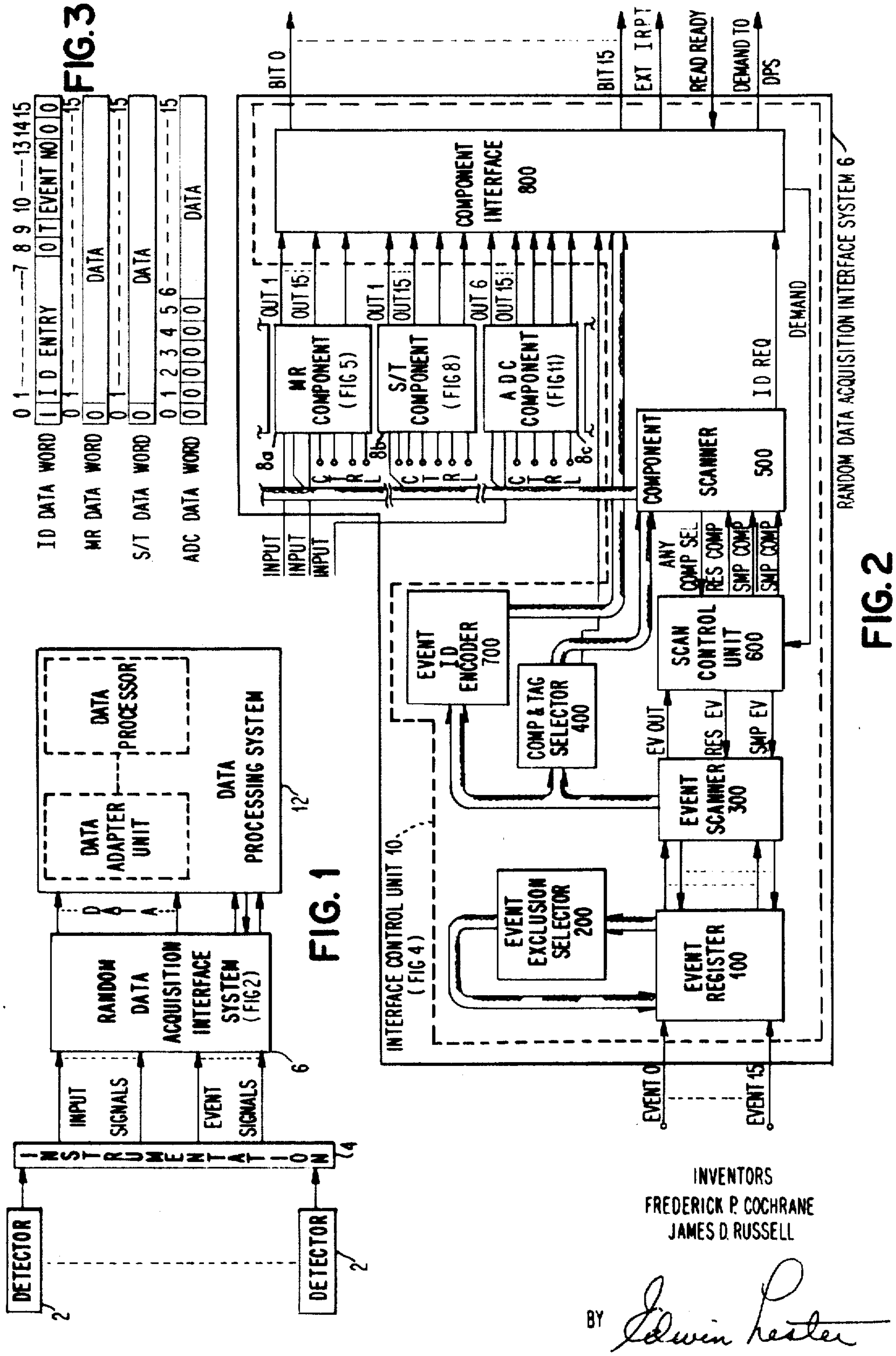
FIG. 1 is an overall block diagram illustrating the general arrangement and interconnections of a data acquisition system.
FIG. 2 shows the breakdown in logical block form of the random data acquisition interface system shown in FIG. 1.
FIG. 3 illustrates the format for the event identification word, the monitor register component data word, the scaler/timer component data word and the analogue to digital converter component data word.

The organization of the random data acquisition interface system will now be described with reference being made to the block diagrams of FIGS. 1 and 2. FIG. 1 shows the general arrangement and interconnections of the major components comprising a data acquisition system. Input sensors or detectors 2 which measure physical quantities such as temperature, pressure, force, flow, acceleration, velocity, sound, energy, etc., are used to convert mechanical optical or thermal physical quantities to electrical signals which are applied to an external instrumentation unit 4. The instrumentation unit 4 may include a variety of devices such as amplifiers, time to amplitude converters, discriminators, single channel analyzers, coincidence detectors, etc. The instrumentation unit 4 is capable of developing both analogue and digital input signals as well as event signals which may be the result of the occurrence of an input signal, the time coincidence of one or more input signals or the time coincidence of one or more input signals and the absence of one or more other input signals. The input signals as well as the event signals are applied to the data acquisition interface system 6 which provides the interface between the instrumentation unit 4 and an online data processing system 12. The interface system 6 translates the input signals which occur on a real time basis into data processing usable form and communicates the resultant data to the data processing system 12.

Referring now to FIG. 2, there is shown a block diagram of the interface system 6 of the present invention which consists of data acquisition components 8 for measuring the signals developed by the instrumentation unit 4 or by various ones of the components themselves and an interface control unit 10 responsive to event signals developed by the instrumentation unit 4 or the components 8 themselves for organizing the data developed by the components for transfer to the data processing system 12. The interface control unit 10 of the present invention is shown as including event register 100, event exclusion selector 200, event scanner 300, component and tag selector 400, component scanner 500, scan control unit 600, event identification encoder 700 and component interface 800.

2. General Description of the Overall Interface

System Operation

Referring now to FIG. 2, the Interface Control Unit 10 provides the user of the system with a means of controlling the transfer of data from the data acquisition components to the data processing system. The data transferred by Control Unit 10 is organized in blocks of information with each block consisting of a plurality of 16-bit words normally headed by an event identification (ID) word followed by one or more component data words. Each block of information represents the data accumulated in response to the occurrence of a unique event signal. FIG. 3 illustrates the formats for the event ID data word, the monitor register component data word, the scaler/timer component data word and the analogue to digital converter component data word. The meaning of each bit position of the event ID word and component data words are given in the following table:

TABLE

| Word-bit position | Meaning |
|---|---|
| Event ID Data Word: | |
| Bit 0 | Always=1, to identify word uniquely as an ID Word |
| Bits 1–7 | Manually set as desired by ID Entry Switches. |
| Bit 8 | Always=0. |
| Bit 9 | If=1, indicates that the event selected has been tagged to cause an immediate interrupt to the data processing system. |
| Bits 10–13 | Four digit binary number to identify the event. |
| Bits 14–15 | Always=0. |
| Monitor register, Data Word: | |
| Bit 0 | Always=0. |
| Bits 1–15 | Component Data. |
| Scaler/timer, Data Word: | |
| Bit 0 | Always 0. |
| Bits 1–15 | Component Data. |
| ADC Data Word: | |
| Bits 0–15 | Always=0. |
| Bits 6–15 | Component Data. |

Component Data is transferred in a fixed sequence, beginning with the lowest numbered component and ending with the highest numbered component associated with an event. Since the number of components associated with each event is variable, the length of the information block is correspondingly variable.

The user of the Interface System, by means of the component selector 400, specifies those components which are to be associated with a given event. The Interface Control Unit upon receipt of an event signal from external instrumentation creates an appropriate identification word, samples the specified components in a predetermined order, and transmits a block of information to the data processing system. Events are processed in numerical sequence with the lowest numbered event having the highest priority. As each event is processed the next one in numerical order which has occurred is serviced. Only one event data transfer operation may take place at one time. Event signals applied to the system while another event is being processed will not be serviced by the system until current event data transfer(s) has been completed.

3. Description of Symbolic Logic used in the System

The functional units of the Interface Control Unit will now be described in greater detail. These functional units are shown in logic form using basic logic circuits such as (1) a positive AND circuit or negative OR circuit, (2) a positive AND-INVERT circuit or negative OR-INVERT circuit, (3) a positive OR circuit or negative AND circuit, (4) a positive OR-INVERT circuit or a negative AND-INVERT circuit and (5) an inverter circuit. The function symbols for these logic circuits are: A for the AND circuit; O for the OR circuit and I for the inverter circuit. Other symbols and their function will be described as the description proceeds. The wedge at an input or output of a logic circuit indicates that the line must be at the least positive potential when the function of the block is satisfied.

The positive AND circuit and the negative OR circuit are identical circuits and may be of the well-known diode gate circuit form. The only difference between the circuits is the logical usage, that is, the positive AND circuit provides a positive output only when all the inputs are in their more positive condition while the negative OR circuit provides a negative output as long as any of the inputs are in their negative condition. The positive AND circuit is represented by a block containing the symbol A having multiple inputs and a single output. The negative OR circuit is represented by a block containing the symbol O having multiple inputs and a single output with wedges at each of the inputs and the output.

The positive AND-INVERT circuit and the negative OR-INVERT circuit are identical circuits and may be of the well-known diode gate circuit form connected to a saturating transistor inverter. The only difference between the circuits is the logical usage, that is, the positive AND-INVERT circuit provides a negative output only when all of the inputs are in their more positive condition while the negative OR-INVERT circuit provides a positive output as long as any of the inputs are in their negative condition. The positive AND-INVERT circuit is represented by a block containing the symbol A having multiple inputs and a single output with a wedge at the output. The negative OR-INVERT is represented by a block containing the symbol O having multiple inputs with a wedge at each of the inputs and a single output.

The positive OR circuit and the negative AND circuit are identical circuits and may be of the well-known diode gate circuit form. The only difference between the circuits is the logical usage, that is, the positive OR circuit provides a positive output as long as any of the inputs are in their positive condition while the negative AND circuit provides a negative output only when all of the inputs are in their more negative condition. The positive OR circuit is represented by a block containing the symbol 0 having multiple inputs and a single output. The negative AND circuit is represented by block containing the symbol A having multiple inputs and a single output with wedges at each of the inputs and the output.

The positive OR-INVERT circuit and the negative AND-INVERT circuit are identical circuits and may be of the well-known diode gate circuit form connected to a saturating transistor inverter. The only difference between circuits is the logical usage, that is, the positive OR-INVERT circuit provides a negative output as long as any of the inputs are in their positive condition while the negative AND-INVERT circuit provides a positive output only when all the inputs are in their more negative condition. The positive OR-INVERT circuit is represented by a block containing the symbol O having multiple inputs and a single output with a wedge at the output. The negative AND-INVERT circuit is represented by a block containing the symbol A having multiple inputs with a wedge at each of the inputs and a single output.

The inverter circuit may be of the well-known saturating transistor form and is represented by a block conditioning the symbol I having a single input and a single output. If a positive signal is applied to the inverter, it is inverted to a negative signal and the symbolic block would be shown with a wedge at the output whereas if a negative signal is applied to the inverter then the symbolic block would be shown with a wedge at the input.

Figures 4, 4A:
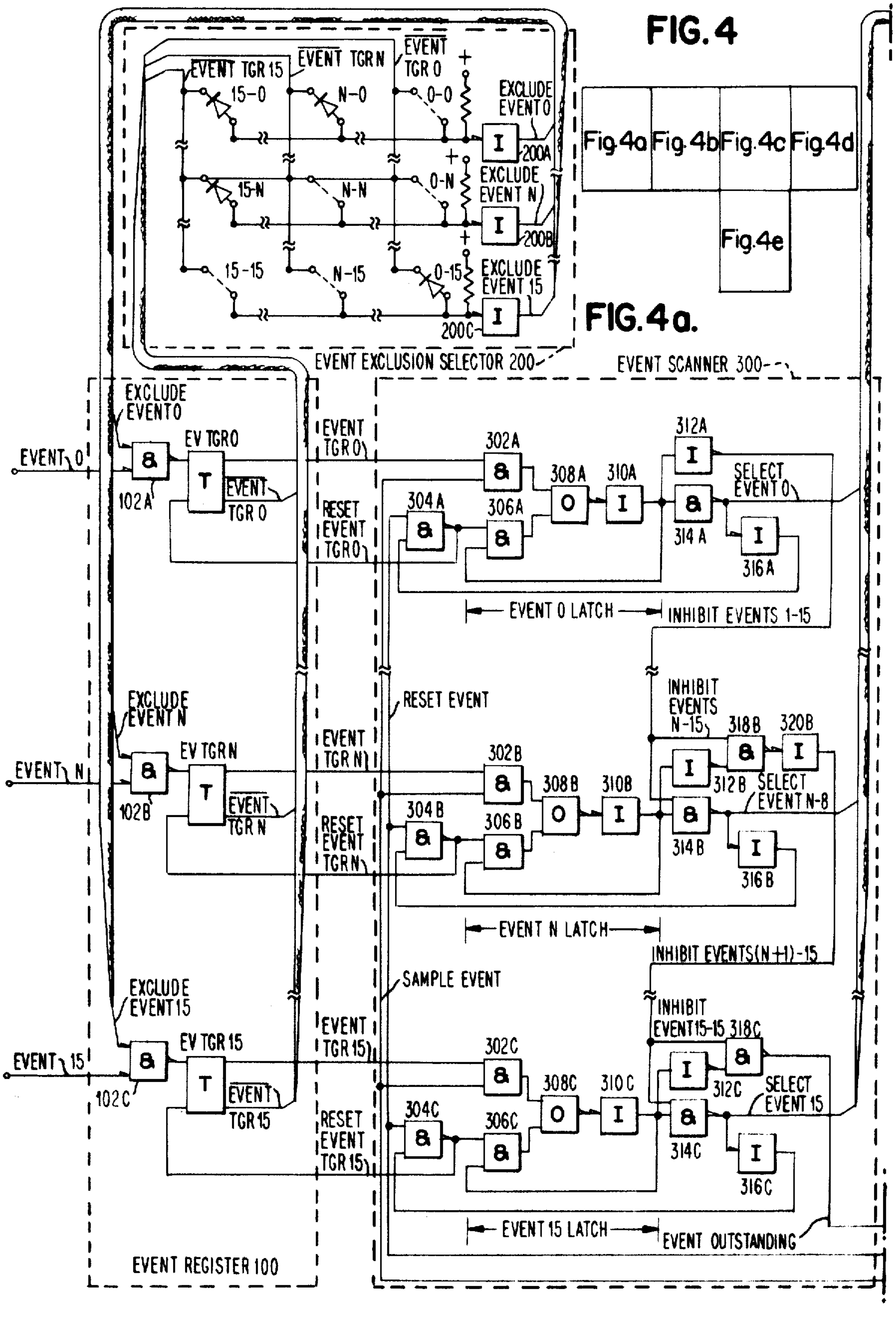
FIG. 4 shows how FIGS. 4*a* to 4*d*, inclusive, may be placed to form a composite block diagram showing a breakdown, in symbolic block form, of the logical block diagrams of the interface control unit.
FIG. 4*a* illustrates, in symbolic block form, the details of the event register, event scanner and event exclusion selector shown in FIG. 2.

4. Detailed Description of the Functional Units of the Interface Control Unit Referring now to FIG. 4*a*, there is shown the event register 100 and the event exclusion selector 200. The event register 100 consists of sixteen triggers, one corresponding to each possible event. Each trigger is set by an external signal corresponding to the occurrence of an event. The setting of an event trigger can be inhibited by an exclude event signal from the event exclusion selector 200. Thus, if an event is not to be excluded, a negative signal is applied via the exclude event line to condition the negative AND circuit 102. Upon the occurrence of an event a negative signal is passed via the associated AND circuit 102 to set the event trigger bringing up the event trigger line and bringing down the event trigger line.

The event exclusion selector 200 consists of a 16×16 matrix plugboard into which diode pins may be inserted. The 16 columns of the matrix correspond to the 16 events. Associated with each column are 16 diode pin positions, each of which may have diode pins selectively inserted depending upon which event associated with the event corresponding to this column it is desired to be excluded, as in the case where events are using shared components. Thus, for example, if a component is shared by event 0 and event 15 and it is desired to exclude event 15 while event O is in process, then a diode pin would be inserted in position 0–15. Correspondingly, in column N, a diode pin is inserted in position O thereby programming the exclusion of event O when event N is selected. Likewise, with respect to event 15, diode pins are inserted in position O and N, thereby programming the exclusion of events O and N upon the occurrence of event 15. Thus, inserting a diode pin enables any event to exclude any other event or combination of events. The event exclusion selector 200 receives inputs from the event register 100. For example, if the event trigger O is set, a negative signal is applied via the event trigger O line to the first column of the event exclusion selector 200. Since a diode pin has been inserted in position 0–15, the diode associated therewith will conduct and a drop in potential will be applied via inverter 202C where it is inverted to a positive signal and applied via the exclude event 15 line to decondition the negative AND circuit 102C in the event register 100 thereby preventing the occurrence of an event 15 signal to set the event trigger 15 so long as event O is being processed. At the same time, since no diode pin has been inserted in the O–O and O–N positions of the event O column, the plus source is inverted to a negative signal and applied via the exclude event O and N lines to condition the AND circuits 102A and 102B in the event register 100 to permit the occurrence of an event O or N signal to set the event trigger O or N, respectively, while event O is being processed. The exclude event signals inhibit the setting of the event triggers until the event causing the exclusion is completed, at which time the event trigger is reset causing the diode associated with the event column to be cut off, thereby permitting all exclude event lines to be brought down conditioning the associated AND circuits of all event triggers to permit an event signal to set any of the event triggers.

The event scanner 300 consists of 16 event latches, each associated with a corresponding trigger of event register 100. The event scanner 300 insures that the event with the highest priority is serviced first and that only one event is serviced at a time. The event latches consist of a pair of positive AND circuits 302 and 306, positive OR-INVERT circuit 308 and an inverter 310. In the quiescent state, a positive signal is maintained on the sample event line to condition the positive AND circuit 302. When the event trigger is set, a positive signal is passed via the AND circuit 302, and inverted by the positive OR-INVERT circuit 308 to a negative signal which is then inverted to a positive signal by the inverter 310. The positive signal output of inverter 310 is applied to the inverter 312, to the single-way positive AND-INVERT circuit 314 and to the two-way positive AND circuit 306. In the quiescent state, a negative signal is maintained on the reset event line to decondition the positive AND-INVERT circuit 304 thereby maintaining a positive signal to condition the positive AND circuit 306 so that the positive signal produced by the inverter 310 passes via the conditioned AND circuit 306 to maintain the latch circuit in a latched condition. The positive signal output of inverter 310 is applied via the one-way AND-INVERT circuit 314 to apply a negative signal to the select event line. This negative signal is inverted to a positive signal by the inverter 316 and applied to condition the AND-INVERT circuit 304 in preparation for resetting the event latch upon the occurrence of a positive signal being applied to the reset event line. The positive signal output of the inverter 310 is also applied to the inverter 312 to thereby apply a negative signal to the inhibit events 1–15 line, thereby deconditioning the positive AND-INVERT circuits 314B and 318B.

The event N latch circuit arrangement is representative of event latches 1 through 14. Assuming that event N latch is the latch associated with event 1 and further assuming that this latch had also been set by virtue of the fact that the event 1 trigger had been turned on, the deconditioning of AND-INVERT circuit 314B would inhibit the signalling of this occurrence on the select event 1 line until such time as the event O latch is reset causing the inhibit events 1—15 line to be returned to a positive level rendering the AND-INVERT circuit 314B effective to bring down the select event 1 line. It should be noted that when the AND-INVERT circuit 314B is deconditioned, a positive signal is applied to the inverter 316B where it is inverted to a negative signal to decondition the AND-INVERT circuit 304B. Therefore, when a positive signal is applied to the reset event line it will pass via the AND-INVERT circuit 304A to reset the event O latch but will be prevented from passing via the AND-INVERT circuit 304B to reset the event 1 latch. As a consequence, at the completion of event O, the event O latch is reset and the event 1 latch remains set. The event O latch in being reset causes a positive signal to be applied to the inhibit events 1–15 line to render the AND-INVERT circuit 314B effective to apply a negative signal to the select event 1 line indicating that this is the next selected event.

Returning again to the condition where the event O latch had been turned on and a negative signal applied via the inhibit events 1—15 line to decondition the AND-INVERT circuit 318B this causes the AND circuit to be deconditioned irrespective of the condition of the event 1 latch. As a consequence, a positive signal is applied to the inverter 320B where it is inverted to a negative signal and applied to the next stage of the event scanner. In a similar manner, a negative signal is caused to ripple through each stage of the event scanner inhibiting the corresponding AND-INVERT circuit 314 thereby inhibiting the signalling of the select event line that the corresponding event latch had been set. Thus, once the highest priority latch is set (signalling a select event) all lower priority select event signals are inhibited despite the setting of corresponding event latches. When the inhibit ripple reaches the sixteenth stage, the AND-INVERT circuit 318C is deconditioned causing a positive signal to be applied to the event outstanding line which now indicates that an event is outstanding and is to be processed. The time between which an event latch is set and the event outstanding line is brought up varies in accordance with the highest priority event latch being set. Thus, if event O latch is the highest priority latch it will take approximately 300 nanoseconds between the setting of the event latch to the rise of the event outstanding line whereas if the event 15 latch is set it will take approximately 20 nanoseconds for the event outstanding line to rise.

Thus, it is seen that the event scanner 300 consists of a plurality of event latches which are set by the triggers of the event register 100 in conjunction with a sample event signal. Additionally, it can also be seen that more than one scan latch can be set at a time; however, only one select event signal will be active at any time.

Figure 4B:
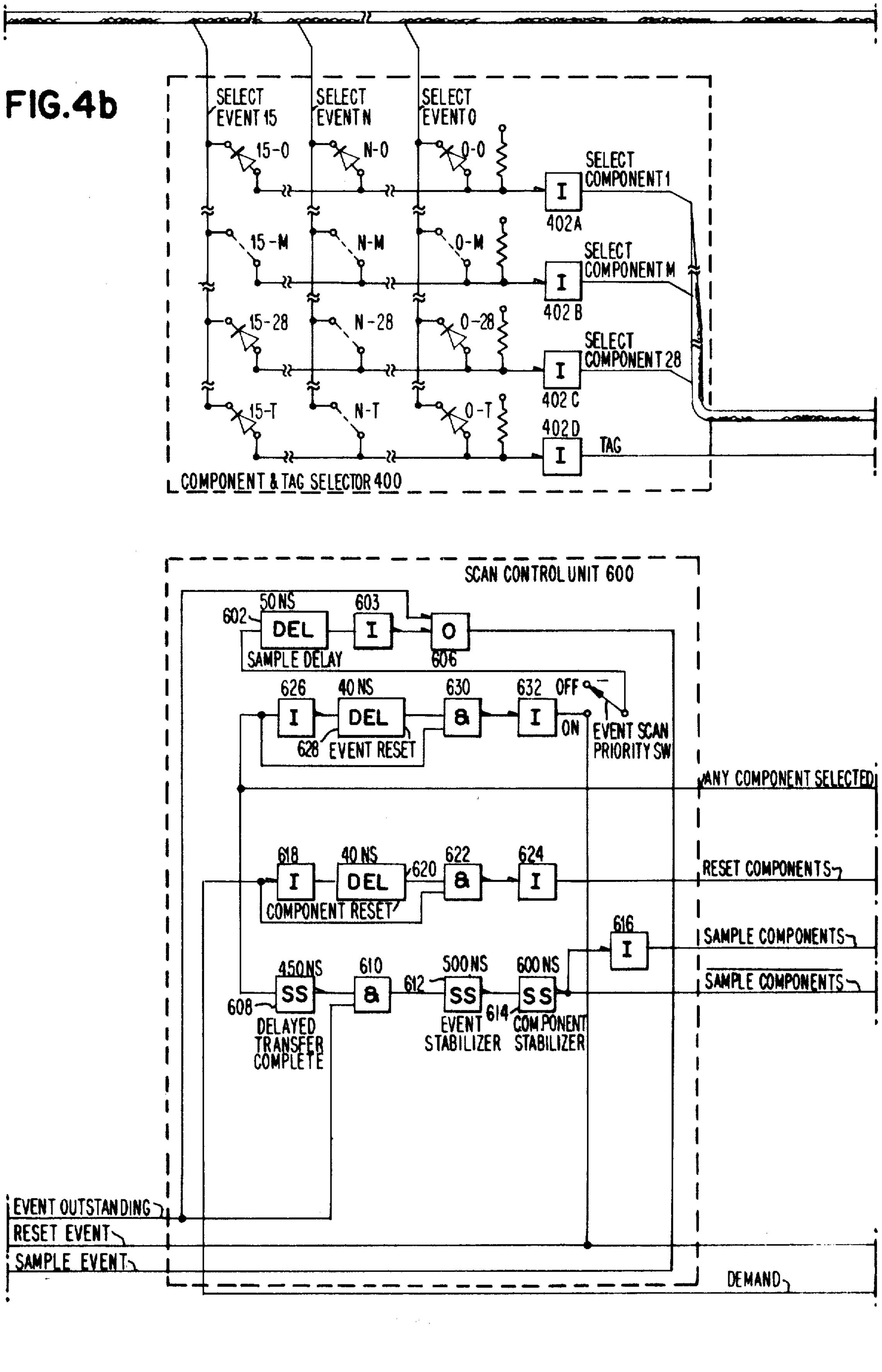
FIG. 4*b* shows, in symbolic block form, the details of the scan control unit and component and tag selector shown in FIG. 2.
Figure 4C:
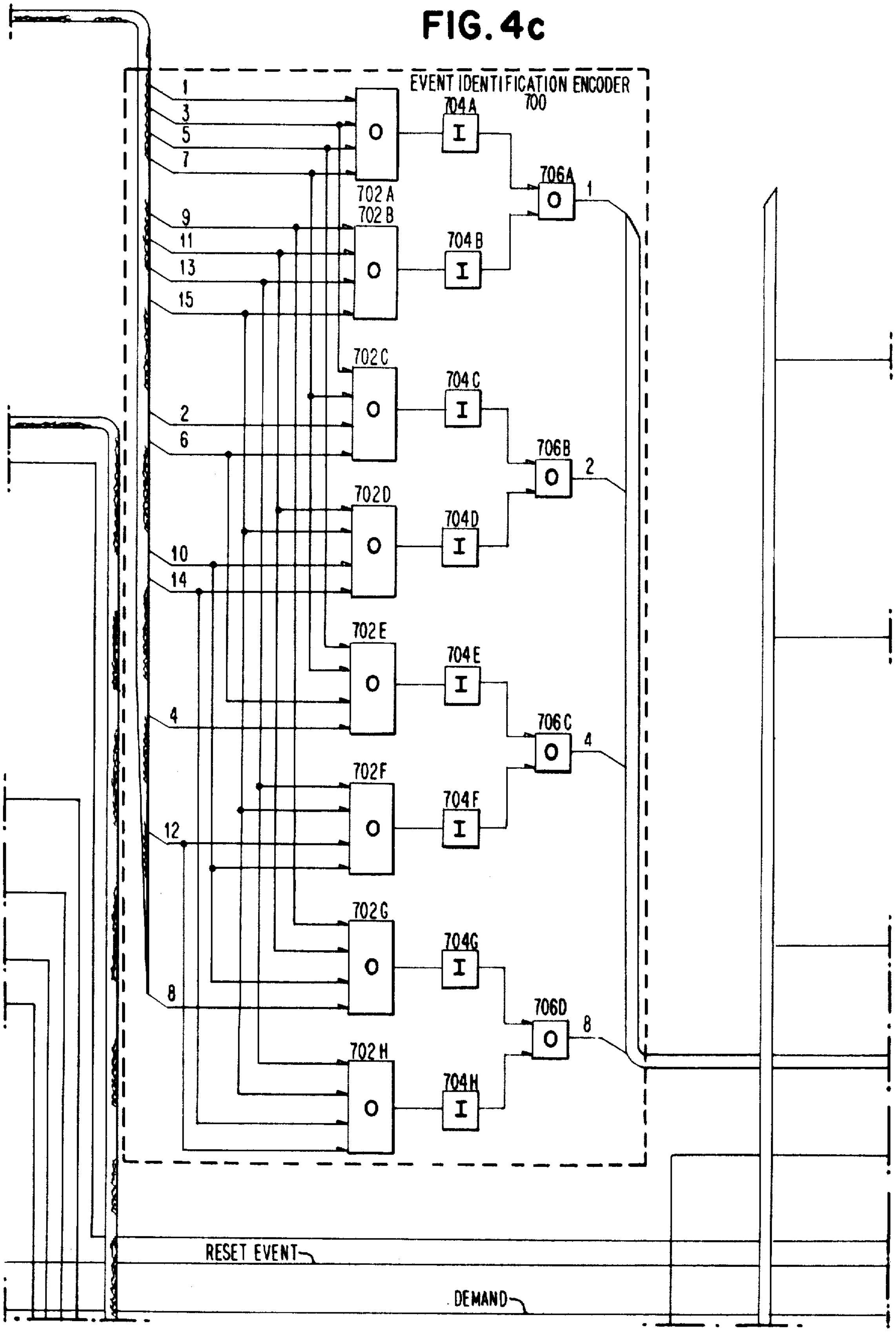
FIG. 4*c* illustrates, in symbolic block form, the details of the event identification encoder shown in FIG. 2.
Figure 4D:
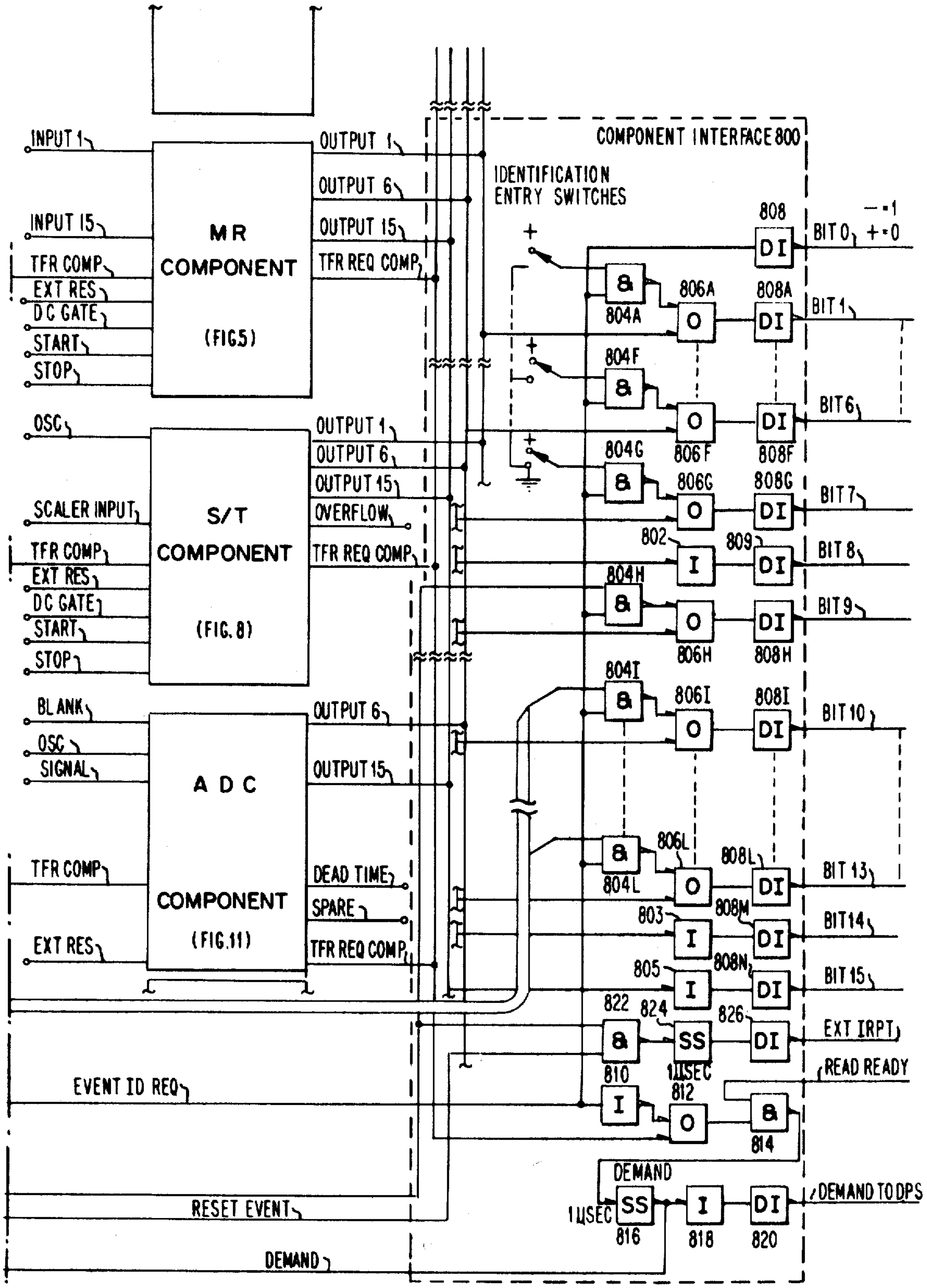
FIG. 4*d* shows, in symbolic block form, the details of the component interface shown in FIG. 2.

Referring now to FIG. 4*b*, the component and tag selector 400 consists of a 16×29 diode matrix plugboard. The 16 columns correspond to the 16 events and 28 of the 29 rows correspond to the 28 data acquisition components which may be associated with any one of the 16 events. A 29th row adjacent to the principle matrix is labeled tag which will be used to signal the data processing unit that an immediate interrupt has been requested for the particular event associated therewith. Connections between rows and columns are made by the insertion of a small diode pin at the appropriate intersection. Once the event scanner 300 has made a selection, such that a negative signal is applied to the select event line, all of the diodes associated with that column in the component selector 400 are rendered conductive thereby applying negative signals to the corresponding inverters 402 which, in turn, apply positive signals on the select component lines. In those rows where no diode pin is inserted, positive signals from the power supply are applied to the corresponding inverters 402 where they are inverted to negative signals on the corresponding select component lines. Thus, for example, let it be assumed that a negative signal is applied to the select event O line which, in turn, renders the diodes at positions O–O, 0–28 and O–T conductive causing negative signals to be applied to inverters 402A, 402C and 402D thereby applying positive signals to the select component 1 line, the select component 28 line and the tag line. The select component signals are applied to condition the input gates of the component scanner 500 shown in FIG. 4*e*.

Figure 4E:
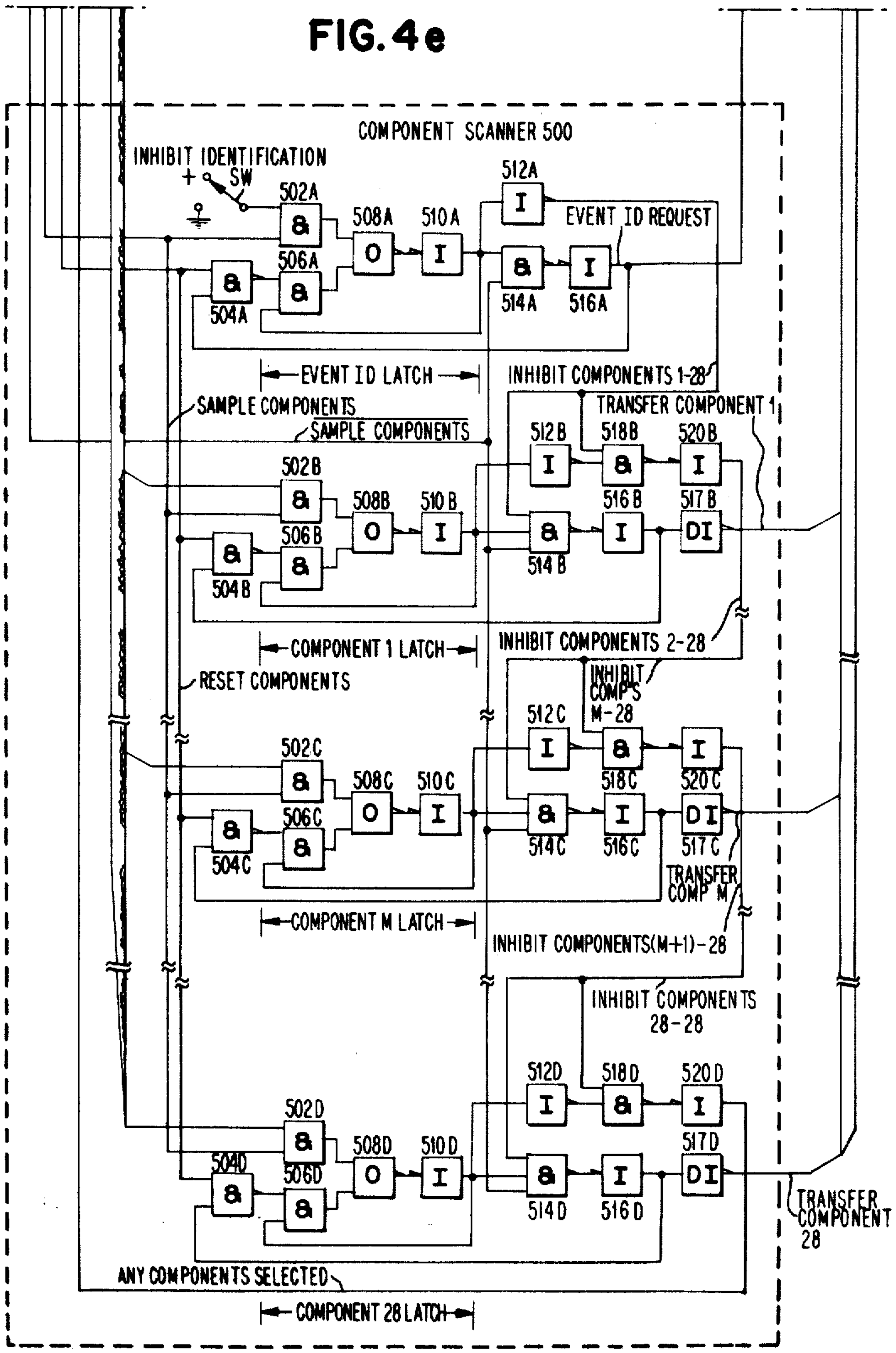
FIG. 4*e* illustrates, in symbolic block form, the details of the component scanner shown in FIG. 2.

Referring now to FIG. 4*e*, the component scanner 500 is similar to the event scanner 200 and consists of 29 component latches, 28 of which are for data acquisition component selection and the remaining one for event identification. The operation of the component scanner 500 is similar to that of the event scanner. Each of the component latches are conditioned or not by the select component signals applied from the component selector 400. Once the event scanner 300 has completed its scan and stabilized and the component selector 400 has completed its selection, a sample components signal is applied to all latches in the component scanner 500. If identification of the event is desired, the event identification latch is set and those of the component latches which have been previously conditioned by component selector 400 are also set upon the production of a positive signal on the sample components line. As in the event scanner, the event identification latch in being set applies a negative signal to the inhibit components 1–28 line which signal will ripple through each of the stages of the component scanner 500 deconditioning the succeeding AND-INVERT circuits 514 and 518. In deconditioning the succeeding AND-INVERT circuits 514, the setting of the corresponding component latch will be inhibited from signalling the data acquisition component via the transfer component line.

Referring now to the event identification (ID) latch, an inhibit ID switch is provided which when positioned at the upper contact applies a positive signal to condition the AND circuit 502A such that when a positive signal is applied to the sample components line the event identification latch is turned on causing a positive signal to be applied to the event ID request line. The positive signal on the event ID request line is applied to signal the component interface 800 that an event identification request is being made. If only one event is to be continuously processed, identification data is unnecessary and an identification word transfer can be prevented by moving the inhibit ID switch to the lower contact position in which case the AND circuit 502A is deconditioned and the event ID latch will not be set and no identification request will be made to the component interface 800.

The positive signal on the event ID request line is applied to condition the positive AND-INVERT circuit 504A in preparation for resetting the event ID latch. Because the succeeding positive AND-INVERT circuits 514 had been deconditioned, due to the inhibit component ripple signal, each of the AND-INVERT circuits 504B, 504C and 504D are deconditioned by negative signals from the inverters 516B, 516C and 516D irrespective of the set or reset conditions of the component latches. Accordingly, after the event identification data word has been transferred, a positive signal on the reset components line is applied to all of the AND-INVERT circuits 504. Since AND-INVERT circuit 504A is the only conditioned AND circuit, the positive signal on the reset component line is applied to reset only the event identification latch. Upon being reset, the event identification latch applies a negative signal to the inverter 512A which, in turn, applies a positive signal to condition the AND-INVERT circuits 514B and 518B. Assuming the component 1 latch had been set, the positive signal output of the latch is inverted to a negative signal by inverter 512B to maintain the AND circuit 518B deconditioned and via the inverter 520B maintains a negative signal on the inhibit components 2–28 thereby inhibiting the outputs of the higher numbered latches.

At this time, a positive signal is maintained on the sample components line and in addition a positive signal is maintained on the output of the component 1 latch both of which are applied to condition the AND-INVERT circuit 514B so that when a positive signal is applied to the inhibit components 1–28 line due to the resetting of the event ID latch, the AND-INVERT circuit 514B is rendered effective to apply a negative signal to the inverter 516B which, in turn, applies a positive signal to the driving inverter 517B which, in turn, transfers a negative signal via the transfer component 1 line to signal the data acquisition component 1 to transfer data. The positive signal output of the inverter 516B is also applied to condition the AND-INVERT circuit 504B in preparation for resetting the component 1 latch after completion of the data transfer. Upon completion of the data transfer from the data acquisition component 1 to the data processing system via the component interface 800, a positive signal is applied via the reset component line to reset component 1 latch which in being reset permits the component scanner 500 to continue to scan for the next highest priority component latch being set and causing the next transfer component signal to be produced to initiate the next data transfer.

Initially, before component selection is made, all of the component latches and the event ID latch are in the reset condition and a positive signal is maintained on the any component select line. As soon as a positive signal is applied to the sample components line to set the event ID latch and one or more of the component latches, the lowest numbered priority latch being set will initate the production of a negative signal on the inhibit components line which will ripple down to the last state to decondition the positive AND-INVERT circuit 518D or if the component 28 latch was one of those that had been set, then, in being set, it would apply a positive signal to the inverter 512D which, in turn, would decondition the positive AND-INVERT circuit 518D causing a negative signal to be applied the inverter 520D which, in turn, would apply a negative signal to the any component selected line indicating that a component latch had been selected. The time between which a component latch is set and the any component selected line is brought down varies in accordance with the lowest numbered priority component latch being set. Thus, if component 1 latch is the lowest numbered priority latch set it will take approximately 560 nanoseconds between the setting of the component 1 latch to the fall of the any component selected line, whereas if the component 28 latch is the lowest numbered priority latch set it will take approximately 20 nanoseconds for the any component selected line to fall.

Thus, it is seen that the component scanner 500 consists of an event ID latch and a plurality of component latches. The event ID latch is always set except when the inhibit identification switch is turned on. The component latches are set by the component selector 400 in conjunction with the sample components signal. Additionally, it can also be seen that more than one component latch can be set at a time, but only one transfer component signal will be active at any time. This is accomplished by inhibiting the AND-INVERT circuits 514B through 514D associated with all of the component latches for a period of time which is greater than the worst case inhibit components ripple time which is approximately 560 nanoseconds by the application of a negative signal on the sample components line. By the time the signal rises on the sample components line, only the AND circuit 514 associated with the highest priority selected component will be conditioned to permit the generation of the transfer component signal associated therewith. When all components of the current event have been serviced, a positive signal is again applied to the any component selected line indicating that no component latches remain selected, and this signal will be applied to the scan control unit 600 which, in turn, will generate a reset event pulse to reset the associated event latch in the event scanner 300 and in turn the event trigger in the event register 100 thereby terminating the processing of this event.

Referring now to FIG. 4*b*, the scan control unit 600 consists of a plurality of pulse generators which receive inputs from the event scanner 300, the component scanner 500 and the component interface 800. The function of the scan control unit 600 is to generate the sample event and sample component signals as well as the reset event and reset component signals.

With the event scan priority switch in the off position and before an event is initiated, a negative signal is maintained on the event outstanding line which is applied as an input to the negative OR-INVERT circuit 606 thereby maintaining a positive signal on the sample event line. Referring to the event scanner 300 in FIG. 4*a*, the positive signal on the sample event line conditions all of the AND circuits 302 in preparation for setting the event latches upon the occurrence of an event signal or signals causing the associated event trigger or triggers to be turned on. Referring again to FIG. 4*b*, after an event has been selected, a positive signal is applied to the event outstanding line which together with the negative signal applied via delay unit 602 and inverted by 603 causes the OR-INVERT circuit 606 to apply a negative signal to the sample event line. The negative signal on the sample event line is applied to decondition all of the input AND circuits 302 of the event scanner 300.

In the quiescent state of the scan control unit 600 the delayed transfer complete single shot 608 applies a positive signal to condition the AND circuit 610 so that when a positive signal is applied to the event outstanding line indicating the occurrence of an event, the signal is passed via the AND circuit 610 to fire the event stabilizer single shot 612. The period of the single shot 612 is chosen to allow stabilization within the event scanner by which time only one select event signal will be effective. Upon the rise of the negative signal output of the event stabilizer single shot 612 the component stabilizer single shot 614 is fired. The period of the component stabilizer single shot is chosen to allow sufficient time for the component scanner to stabilize so that only one transfer component signal will be generated. The negative signal output of the component stabilizer single shot 614 is applied via inverter 616 to apply a positive signal to the sample components line which is used to set the event ID latch and those of the component latches which were conditioned by the output of the component selector 400. As explained above, the negative signal output of the component stabilizer single shot 614 is also applied to the sample components line to decondition all of the AND-INVERT circuits 514 associated with the component latches to allow sufficient time for the inhibit components ripple and the selection of a single transfer component signal.

After each transfer request, the component interface 800 applies a negative signal via the demand line back to the scan control unit 600 where it is applied to the inverter 618 and the AND circuit 622. The inverter 618 inverts the signal to a positive signal and after a delay of 40 nanoseconds via the delay circuit 620 conditions and AND-INVERT circuit 622. At the end of the negative signal on the demand line, a positive signal is then applied to render the conditioned AND-INVERT circuit 622 effective to pass a negative signal to the inverter 624. The signal will have a duration of 40 nanoseconds at the end of which the positive signal on the demand line which is inverted to a negative signal by the inverter 618 will have reached the AND-INVERT circuit 622 thereby deconditioning the AND-INVERT circuit after the 40 nanosecond period. The negative signal output of the AND-INVERT circuit 622 is inverted by the inverter 624 to a positive signal on the reset components line. The component latch just serviced in the component scanner is then reset and the next transfer component signal is activated. Thus, for each data acquisition component data transfer, a demand pulse is generated indicating the completion of the data transfer and initiating the resetting of the component latch by the application of a positive pulse on the reset components line. When all the data acquisition components associated with the selected event have been serviced, it will be recalled that a positive signal will be applied to the any component selected line indicating that condition. The positive signal on the any component selected line is sampled to a pulse generator consisting of inverter 626, event reset delay unit 628, AND-INVERT circuit 630 and inverter 632 which operates in exactly the same way as the component reset pulse generator 618 to 624. The result is to generate a 40 nanosecond positive signal on the reset event line to reset the event latch in the event scanner 300 associated with the event that had just been serviced. At the same time the positive signal on the any component selected line is applied to fire the delayed transfer complete single shot 608 which deconditions the AND circuit 610 for a period of approximately 450 nanoseconds. This delay is to allow sufficient time from the time the event latch associated with the just completed event to be reset and in being reset initiate a ripple through the scanner at the end of which a negative signal will again be applied to the event outstanding line which will occur before the end of the 450 nanosecond delay. The worst case ripple would be from the event 0 latch which would cause a ripple of approximately 300 nanoseconds after which the negative signal would be applied to the event outstanding line to maintain the AND circuit 610 deconditioned. Consequently, at the end of the negative pulse applied by the delay transfer complete single shot 608 a positive signal will be applied to the AND circuit 610 which, however, is now deconditioned by the negative signal on the event outstanding line and therefore, will inhibit initiating the sample components signal.

In the event that more than one event latch had been set, then, upon the generation of the reset event pulse the highest priority event latch would be reset and the next highest priority event latch would be rendered effective to generate a select event signal and also maintain via the ripple circuitry a positive signal on the event outstanding line to condition the AND circuit 610. Consequently, at the end of the negative pulse applied by the delayed transfer complete single shot 608, the AND circuit would again be rendered effective to initiate the generation of the sample component signal to permit the setting of the component latches associated with this next event. Thus, so long as any event latch remains set, a positive signal is maintained on the event outstanding line such that upon completion of servicing all of the components associated with any one event, the rise of the any component selected line will via the delay transfer complete signal shot 608 initiate the next sampling of the components associated with the next event. Ultimately, when the last event latch of the group that initially was set into the event scanner is reset a negative signal is applied to the event outstanding line to decondition the AND circuit 610 and inhibit the generation of any further sample components signals.

It can be appreciated from the above that when a number of events occur prior to the termination of the sample event signal or if a plurality of events occur while a previous event or events are being processed, then these multiple events can be designated as an event group. In either case, the event group content of the event register 100 is transferred to the event latches in the event the event scanner 300 and are then processed in an ascending numerical sequence with the lowest number event being given the highest priority and without regard to the order in which the event signals were received by the system. As an example, assume that no events are presently being processed but that event signals are received on event input lines 3, 1 and 8, in that order, each of which is effective to turn on the associated event trigger of the event register 100. Since no event is presently being processed, a positive signal is maintained on the sample event line permitting the event group content of the event register 100 to be transferred to the event latches 300 with event 1 latch being given the highest priority regardless of the fact that it was the second occurring event followed by event 3 being given the second highest priority and event 8 being given the lowest priority. Thus, events 1, 3 and 8 would be processed in that order. If while processing this event group, signals had been received on the event input lines 4 and 2 in that order, they would be processed in ascending numerical sequence, that is, event 2 followed by event 4, after completion of the processing of the first event group, namely, events 1, 3 and 8. Thus, when operating in a nonpriority mode, all events of a current event group are processed in an ascending numerical sequence only after all events of a preceding event group have been completely processed.

The scan control unit 600 is provided with an event scan priority switch which when turned to the on position will permit the system to operate in a priority mode which permits an event group to be transferred to the event latches immediately upon completion of the event currently being processed so that it is not necessary to await the completion of all events of the previous scan group. The effect of this is to provide highest priority to the lowest numbered events when operating in the priority mode. As an example of the priority mode, assume that the system is presently not processing any events and a signal is received on the event input 2 line setting the event 2 trigger and, assuming no event is presently outstanding, the event 2 latch is immediately set and the system proceeds to transfer data from all of the data acquisition components associated with event 2. Now, let it be assumed that while this data transfer is underway, event signals are received for events 1, 3 and 8 in any order causing the event triggers associated therewith to be set and registering an event group awaiting service. After completion of event 2 the event latches 1, 3 and 8 are set and the lowest numbered event, namely event 1, is given the highest priority and processing is initiated. Now, let it be assumed that while event 1 is being processed as before, event signals are received on event input lines 2 and 4 to set their associated event triggers. If the system had been in a nonpriority mode, then the occurrence of these two events as a second event group would not be transferred to the events scanner until completion of the last event of the first event group. However, in the priority mode upon completion of event 1, event 2 and 4 latches would be immediately set with event 2 being processed before event 3 and event 4 being processed before event 8. Again, if the system were in the priority mode and event 2 was not being processed and while being processed another event 1 input occurred in a similar manner at the completion of event 2, the event 1 latch would again be set and take precedence over processing of events 3, 4 and 8. Thus, highest priority is continuously given to the lowest numbered events when operating in the priority mode.

Referring to the scan control unit 600 in FIG. 4*b*, when the event scan priority switch is turned off, then, in the quiescent state, a negative signal is applied via the delay unit 602 and inverted by inverter 603 to a positive signal which is then applied to one input of the negative OR-INVERT circuit 606. Also, in the quiescent state of the event scanner 300, a negative signal is maintained via the event outstanding line to the other input of the negative OR-INVERT circuit 606 thereby maintaining a positive signal on the sample event line to permit sampling of the event register 100 and transferring an event group to the event latches of the event scanner 300. As soon as the event scanner 300 has stabilized a positive signal is applied to the event outstanding line which now causes the negative OR-INVERT circuit 606 to apply a negative signal on the sample event line until all events associated with the event group has been processed at which time a negative signal is again applied to the event outstanding line thereby causing the negative OR-INVERT circuit 606 to apply a positive signal to the sample event line.

When the event scan priority switch is turned on, then, in the quiescent state of the scan control unit 600, a negative signal on the reset event line is applied via delay unit 602 and again inverted by inverter 603 to a positive signal which is applied to one input of the negative OR-INVERT circuit 606. Also, in the quiescent state of the event scanner 300, as before, a negative signal is maintained via the event outstanding line to the other input of the negative OR-INVERT circuit 606 thereby maintaining a positive signal on the sample event line to permit sampling of the event register 100 as before and transfer an event group to the event scanner 300. As soon as the event scanner 300 has stabilized a positive signal is again applied to the event outstanding line causing the negative OR-INVERT circuit 606 to apply a negative signal to the sample event line. Upon completion of the processing of the first event of the transferred event group, the positive signal on the reset event line after being delayed 50 nanoseconds to allow for resetting of the event latches of the event scanner 300 by the delay unit 602 is inverted by inverter 603 to a negative signal which is now effective to apply a positive signal to the sample event line permitting another event group to be transferred to the latches of the event scanner 300 before proceeding with the processing of the next event.

Referring now to FIG. *4c*, the event identification encoder 700 functions to convert a decimal digit to a binary value. The logic of the encoder 700 consists simply of a plurality of OR circuits 702, corresponding inverter circuits 704 and a plurality of OR circuits 706 connected to pairs of the inverters 704. The inputs to the OR circuits 702 are the select event signal outputs of the event scanner 300. Table 1 below indicates the outputs of the encoder 700 corresponding to each of the select event signals.

TABLE 1

| | OR-706D | OR-706C | OR-706B | OR-706A |
|---|---|---|---|---|
| | 8 | 4 | 2 | 1 |
| Select event 0 | − | − | − | − |
| Select event 1 | − | − | − | + |
| Select event 2 | − | − | + | − |
| Select event 3 | − | − | + | + |
| Select event 4 | − | + | − | − |
| Select event 5 | − | + | − | + |
| Select event 6 | − | + | + | − |
| Select event 7 | − | + | + | + |
| Select event 8 | + | − | − | − |
| Select event 9 | + | − | − | + |
| Select event 10 | + | − | + | − |
| Select event 11 | + | − | + | + |
| Select event 12 | + | + | − | − |
| Select event 13 | + | + | − | + |
| Select event 14 | + | + | + | − |
| Select event 15 | + | + | + | + |

Referring now to FIG. *4d*, the component interface 800 functions as the interface between the data acquisitions interface system and the data processing system. Data transfer operations are initiated under program control by the application of a positive signal via the read ready line from the data processing system to the component interface signalling the data acquisition interface system that the data processing system is in a condition to receive data. When input data is available the component interface 800 will issue a demands signal back to the data processing system indicating that data is now present on the output data bus. The data processing system accepts the data and drops the read ready line. After approximately 4 microseconds the data processing system will again raise the read ready line, thus informing the component interface 800 that the data processing system is ready to accept the next word of data. When data is again available, the component interface 800 will produce another demand signal to the data processing system and the data transfer operation will proceed. For each event being processed, the component interface 800 multiplexes the event identification data and the component data from all of the components associated with the event onto the single output data bus. Corresponding bit lines from each of the data acquisition components are commonly connected to single bit lines, that is, for example, the bit 1 line connected to the OR circuit 806A. Similarly, the transfer request component lines from each of the data acquisition components are commonly connected via a single line to one input of the negative OR-INVERT circuit 812. A negative signal applied to the transfer request line from a data acquisition component indicates to the component interface 800 that the component has placed data on its data lines which is passed via the negative OR-INVERT circuits 806 and applied via the driver inverters 808 to the bit lines of the output data bus.

It will be remembered when the component scanner 500 initiates a scan operation, the event ID latch is set and a positive signal is applied to the event ID request line. This positive signal is applied to the positive AND-INVERT circuits 804, the driving inverter 808 and the inverter 810. The driving inverter 808 inverts the positive signal to a negative signal indicative of a binary one which will identify the word as the event ID word to the data processing system.

Seven bits of arbitrary information specified by the user may be entered by means of the identification entry switches thereby providing such information as the date or a code number, etc. Accordingly, the AND-INVERT circuits 804A to 804G will be conditioned in accordance with the setting of the entry switches. Upon the occurrence of the positive signal on the event ID request line, those of the AND-INVERT circuits which are conditioned will apply a negative signal to the corresponding negative OR-INVERT circuits 806A to 806G which, in turn, apply positive signals to the corresponding driving inverters 808A to 808G causing negative signals to be applied to the corresponding bit lines of the output data bus.

Since at this time none of the data acquisition components are selected, a positive signal is applied via the bit 8 line to inverter 802 where it is inverted to a negative signal and applied via the driving inverter 809 as a positive signal to the bit 8 line of the output data bus indicating a binary 0.

The bit 9 input to the component interface 800 is connected to the component and tag selector 400. If a diode pin has been inserted at the intersection of the tag row and the selected event column, a positive signal is applied to condition the AND-INVERT circuit 804H. Consequently, the positive signal on the event ID request line is applied to render the AND-INVERT circuit 804H effective to apply a negative signal to the negative OR circuit 806H where it is inverted to a positive signal and via the driving inverter 808H is inverted to a negative signal which is applied to the bit 9-line of the output data bus indicative of a binary 1. This tag bit signal may be used to specify an immediate interrupt to the data processing system. Upon completion of the selected event a positive signal on the reset event line in conjunction with the positive signal on the TAG line is effective to cause the AND-INVERT circuit 810 to apply a negative signal to fire the 1 μsec. single shot 824 which via the driving inverter 826 applies a negative signal to the external interrupt line to signal an interrupt condition to the data processing system and the specific event which caused the interrupt being indicated by the tag bit in the event identification word.

Input bits 10 through 13 are connected to the output of the event ID encoder 700. Accordingly, the AND-INVERT circuits 804I to 804L are conditioned in accordance with the binary representation of the selected event. This binary representation is passed via the AND-INVERT circuits 804I to 804L by the occurrence of the positive signal on the event ID request line and via the corresponding OR circuits 806 and driving inverters 808 to the bit 10 to bit 13 lines of the output data bus.

Input bit 14 and 15-lines are connected to the data acquisition components, none of which are selected at the present time and, accordingly, positive signals are maintained on these lines which signals are inverted by the inverters 803 and 805, respectively, to negative signals and applied via corresponding driving inverters to positive signals on the bit 14 and bit 15-lines of the output data bus.

The positive signal on the event ID request line is inverted by the inverter 810 and applied as a negative signal to the negative OR-INVERT circuit 812 which in turn applies a positive signal to the positive AND-INVERT circuit 814. Since it was assumed that a read ready signal had been applied by the data processing system to condition the AND circuit 814, it now passes a negative signal to fire the 1 microsecond demand single shot 816. The negative demand signal is applied back to the scan control unit 600 where it will initiate the generation of a reset components pulse which, in turn, will be effective to reset the event ID latch in the component scanner 500. The negative signal on the demand line is also passed via inverter 818 and driving inverter 820 as a negative signal on the demand to DPS line to signal the data processing system that the event identification word is presently on the output data bus.

After the event ID latch is reset in the component scanner 500, the component scanner 500 then scans for the first selected component and produces a transfer component signal which is applied to the selected data acquisition component requesting a transfer of data from that component. If the selected data acquisition component is a monitor register or a scaler/timer, then upon selection by the component scanner the data acquisition component places the content of its data register, in the case of the monitor register, or places the contents of the binary counter, in the case of the scaler/timer, on the output data lines and applies a negative signal to the corresponding transfer request line. If the selected data acquisition component is an analogue-to-digital converter, then upon selection by the component scanner and when the conversion is completed, the ADC transfers a 10-bit binary data word to the component interface 800 for transfer via the output data bus to the data processing system and applies a negative signal to the corresponding transfer request component line. The negative signal on the transfer request component line is applied to the negative OR-INVERT circuit 812 where it is inverted to a positive signal and applied to condition the AND circuit 814. Upon the next occurrence of a positive signal transmitted by the data processing system via the read ready line, the AND-INVERT circuit 814 is effective to fire the 1 microsecond demand single shot 816 causing a negative demand single to be applied back to the scan control unit 600 where it is effective to again initiate the generation of a reset component signal which is effective in the component scanner 500 to reset the highest priority selected component latch in preparation for continuing the scan for the next highest priority component latch which is in a set condition. The demand signal is also passed via the inverter 818 and the driving inverter 820 to apply a negative signal to the demand to DPS line to signal the data processing unit to take the component data presently on the output data bus. In a similar manner each component data word is multiplexed to the output data bus in succession, with the succession of data words comprising the event message.

5. Detailed Description of the Data Acquisition Components

The random data acquisition interface system uses three types of components, namely, a monitor register (MR), a scaler/timer (S/T), and an analogue digital converter (ADC).

The components are activated by external equipment for the purpose of gathering data, counting inputs or measuring the time between inputs, and making analogue to digital conversions. The control unit section of the data acquisition interface system, under external control, scans and reads out the selected components configured for the particular operation and transfers the data to the data processing system. The three types of components used with the system can thus be arranged in any configuration dependent upon the user application. A detailed description of the components is contained in the following:

MONITOR REGISTER

Figures 5, 6:
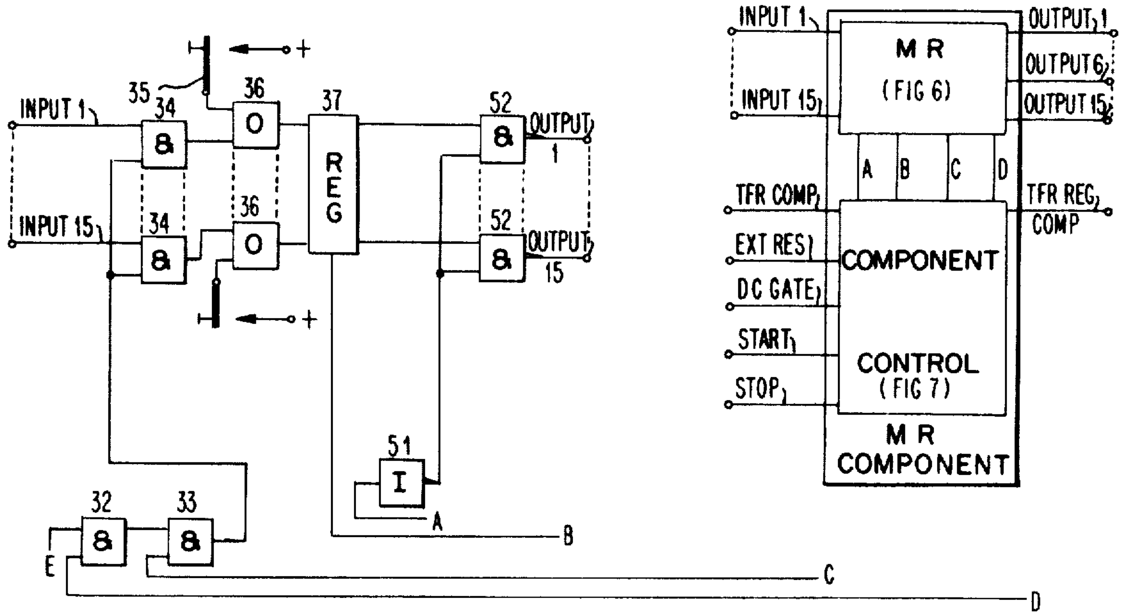
FIG. 5 shows the block symbol of a monitor register component used in the invention.
FIG. 6 illustrates, in symbolic block form, the details of the monitor register portion of the block symbol shown in FIG. 5.
Figure 7:
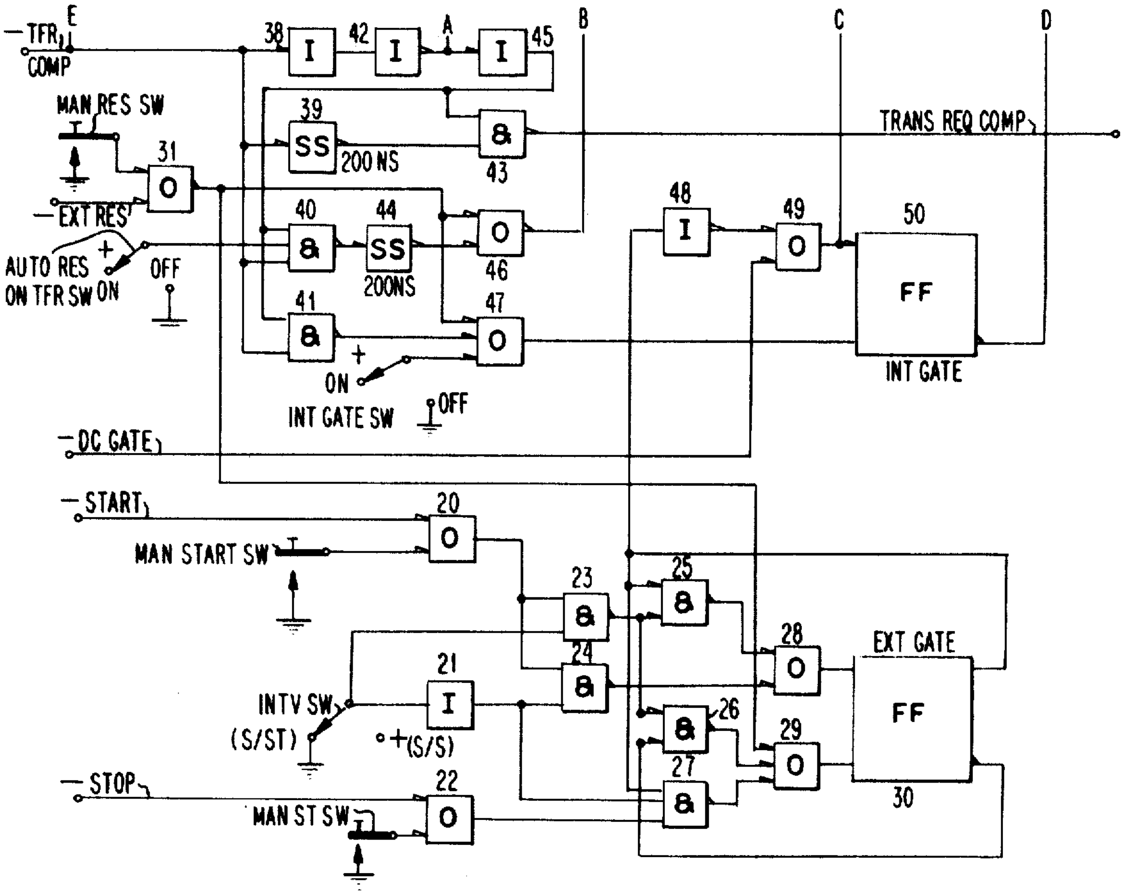
FIG. 7 shows, in symbolic block form, the details of the component control portion of the block symbol shown in FIG. 5.

Referring to FIG. 5, the Monitor Register Component is composed of a Monitor Register and Component Control sections shown in FIGS. 6 and 7, respectively. The monitor register includes a 15-bit parallel input binary register that is normally used to monitor the condition of 15 different signal lines during an active gate interval. Input signals may be applied to the monitor register from external sources or by manual push buttons for each of the register positions. The period during which the register position may be set by external signal inputs is termed the active gate interval. Upon selection by the interface control unit 10, the monitor register component passes the contents of its data register via the output data bus of the component interface 800 to the data processing system. Operation of appropriate switches permits the monitor register to respond to a single or successive active gate intervals between data transfers and to elect whether or not to reset the monitor register on completion of a data transfer. The register may be reset automatically on the completion of the data transfer, manually, or externally.

There are four methods of controlling the active gate intervals. These are termed the start/stop, start/start, DC gate and manual intervals.

START/STOP

In the quiescent state of the monitor register, positive signals are maintained on the transfer component line and the output line of the initially off interval gate flip-flop 50 to render the AND circuit 32 effective to apply a positive signal to condition the AND circuit 33. However, the initially off external gate flip-flop 30 maintains a negative signal via inverter 48 and negative OR-INVERT circuit 49 to decondition the AND circuit 33 thereby causing a negative signal to be applied to decondition the AND circuits 34. The AND circuits 34 in being deconditioned inhibit the transfer of any input signal data on the input lines to the register 37 until the start of the active gate interval.

With the interval switch set to the start/stop (S/ST) position as shown, a negative signal is applied to decondition the positive AND-INVERT circuit 23 and via inverter 21 to one input of the positive AND-INVERT circuit 27 and to condition the positive AND-INVERT circuit 24. When a negative signal is applied to the start line, the negative OR-INVERT circuit 20 applies a positive signal to one input of the positive AND-INVERT circuit 23 and to render the AND circuit 24 effective to apply a negative signal to the negative OR-INVERT circuit 28 which, in turn, is effective to apply a positive signal to turn on the external gate flip-flop 30. The external gate flip-flop in being turned on applies a positive signal to condition the positive AND-INVERT circuit 27. The positive signal output of the external gate flip-flop 30 is also applied to inverter 48 where it is inverted to a negative signal to render the negative OR-INVERT circuit 49 effective to apply a positive signal to the conditioned AND circuit 33. The AND circuit 33 is now effective to apply a positive signal to condition the AND circuits 34 thereby permitting input signal data on the input lines to be passed via OR circuits 36 to the register 37.

At the end of the active gate interval, a negative signal is applied via the stop line to the negative OR-INVERT circuit 22 which, in turn, applies a positive signal to render the AND circuit 27 effective to apply a negative signal to the negative OR-INVERT circuit 29. The negative OR circuit 29 in turn applies a positive signal to reset the external gate flip-flop 30. The external gate flip-flop 30 in being reset applies a negative signal to the inverter 48 where it is inverted to a positive signal and applied to the negative OR-INVERT circuit 49. The negative OR-INVERT circuit 49 in turn applies a negative signal to turn on the internal gate flip-flop 50 and to decondition the AND circuit 32 which in turn successively deconditions the AND circuit 33 and AND circuits 34 to terminate the active gate interval and block any further changes on the input lines from being transferred to the register 37.

When the control unit selects the component to transfer data, a negative signal is applied via the transfer component line to the inverter 38 and to fire the transfer delay single shot 39 which applies a negative deconditioning signal to the positive AND-INVERT circuit 43 for the period of the single shot. The inverter 38 inverts the signal to a positive signal which is applied to the inverter 42 where it is inverted to a negative signal and applied to the inverters 45 and 51. The inverter 51 inverts the negative signal to positive signal to render the positive AND-INVERT circuits 52 effective to transfer the contents of the monitor register to the output lines. The inverter 45 inverts the negative signal to a positive signal which is applied to condition the positive AND-INVERT circuits 40, 41, and 43. At the end of the period of the transfer delay single shot 39, the AND-INVERT circuit 43 is rendered effective to apply a negative signal to the transfer request component lines which is used to initiate signalling a demand to the data processing system to take the data from the monitor register and to initiate the termination of the selected transfer component signal.

Upon termination of the negative signal on the selected transfer component line, a positive signal is again applied via the selected transfer component line to the AND-INVERT circuits 40 and 41. The conditioned AND-INVERT circuit 41 is rendered effective to apply a negative signal to the negative OR-INVERT circuit 47. Assuming that the interval gate switch is set to the on position, that the manual reset switch has not been actuated and that no external reset is being called for, the negative OR circuit 31 maintains a positive signal on a first input of the negative OR-INVERT circuit 47 while the interval gate switch maintains a positive signal on a second input of the negative OR circuit 47. Consequently, when the AND-INVERT circuit 41 is rendered effective to apply a negative signal to the negative OR-INVERT circuit 47 which, in turn, applies a positive signal to reset e interval gate flip-flop 50. The interval gate flip-flop 50 in being reset applies a positive signal to render the AND circuit 32 effective to apply a positive signal to condition the AND circuit 33 in preparation for another sampling of the monitor register.

Assuming that the automatic reset on transfer switch is set to the on position, the switch maintains a positive signal on a first input of the AND-INVERT circuit 40 while the inverter 45, during the period of the negative signal on he transfer component line, maintains a positive signal on a second input of the AND-INVERT circuit 40. Consequently, at the end of the aforesaid period, the positive signal on the transfer component line renders the AND-INVERT circuit 40 effective to apply a negative signal to fire the transfer single shot 44 to apply a negative signal to the negative OR circuit 46. The OR circuit 46 is effective to apply a negative signal to reset the register 37 in preparation for the next sample.

Thus, it should be apparent from the above-description that with the interval switch set to the start/stop position, the interval gate switch set to the on position and the automatic reset on transfer switch set to the on position, a single active gate interval is generated from the start signal to the stop signal during which the condition of the input lines are sampled by the monitor register and then transferred to the output lines when a data transfer is called for, after which the register is reset in preparation for another sampling.

It should be noted that the interval gate switch provides two modes of internal gate operation. With the switch set to the on position, only a single active gate interval is permitted between data transfers since the interval gate flip-flop 50 is turned on at the end of the active gate interval to decondition the AND circuits 32, 33, and 34. Consequently, successive active gate intervals between data transfers cause negative OR-INVERT circuit 49 to generate successive position signal which will be ineffective to pass the deconditioned AND circuit 33 to condition the AND circuits 34 thereby inhibiting any further data transfer to the register 37 after the first active gate interval. However, if the internal gate switch is switched to the off position, then the internal gate flip-flop 50 will be maintained off by the negative OR-INVERT circuit 47 preventing the switching thereof in the first instance so that internal gate flip-flop 50 maintains a positive signal via AND circuit 32 to condition the AND circuit 33. Consequently, active gate intervals between data transfers cause negative OR-INVERT circuit 49 to generate successive positive signals which will be effective to pass the conditioned AND circuit 33 to successively condition the AND circuits 34 thereby permitting successive samplings of the input signal lines by the register 37 between data transfers.

The automatic reset on transfer switch provides two modes of operation. With the switch set to the transfer position the monitor register is reset on completion of each data transfer as described above, whereas when the switch is set to the off position accumulation of input signal data is permitted until such time as the occurrence of an external reset signal or manual reset push button switch is activated. Thus, if the automatic reset on transfer switch is switched to the off position a negative signal is applied to decondition the AND-INVERT circuit 40 so that at the end of the transfer component signal, when a positive signal is again applied to the transfer component line, it is inhibited from rendering the AND-INVERT circuit 40 effective to fire the single shot 44 to initiate the resetting of the register 37 after the data transfer. If the manual reset switch is subsequently activated or if a negative signal is applied to the external reset line, the negative OR circuit 31 will apply a negative signal to the OR circuit 46 which will then be effective to cause a reset of the register 37.

An alternate method of data input is provided by manual push button switches for each of the register positions. By depressing the push button switch a mechanical lock-up occurs and an on condition is continuously applied via the OR circuit 36 to the corresponding register position regardless of the status of the active gate interval. While the push button switch is mechanically locked-up, an automatic, manual or external reset will have no effect upon data set into the register in this manner. However, by depressing the push button switch a second time, the mechanical lock-up is released and the data register position may be cleared by the next automatic manual or external reset. Using this method a fixed pattern may be set into the monitor register which may be continually transmitted for each data transfer.

START/START

The second method of controlling the active gate interval is the start/start mode of operation. In this mode of operation the interval switch is switched to the start/start (S/S) terminal causing a positive signal to be applied to condition the AND-INVERT circuit 23 and to be inverted to a negative signal by the inverter 21 to decondition the AND-INVERT circuit 24 and prevent it from responding to a positive signal from the negative OR-INVERT circuit 20 upon the occurrence of a start signal. The external gate flip-flop 30 in being initially off applies a negative signal to condition the negative AND circuit 25. When a negative pulse is applied to the start line, it causes the negative OR-INVERT circuit 20 to apply a positive signal to render the AND-INVERT circuit 23 effective to apply a negative signal to the conditioned AND circuit 25 which, in turn, is effective via the negative OR-INVERT circuit 28 to turn on the external gate flip-flop 30. The flip-flop 30 in being turned on applies a negative signal to condition the negative AND circuit 26. From this point, the circuit will operate in exactly the same manner as the start/stop mode causing the initiation of the active gate interval to permit data to be transferred from the input lines to the register 37. At the end of the active gate interval, a negative pulse is again applied to the start line which causes the negative OR-INVERT circuit 20 to apply a positive signal to render the AND-INVERT circuit 23 effective to apply a negative signal to the conditioned negative AND circuit 26. The AND circuit 26 is effective to reset the external gate flip-flop 30 via the negative OR-INVERT circuit 29 thereby terminating the active gate interval for which data was sampled and stored in the register 37. As before, the control unit will apply a negative signal to the transfer component line which will be effective to cause the data presently stored in the register 37 to be transferred to the output lines after which the internal gate flip-flop 50 and register 37 are reset.

DC GATE

The third method of controlling the active gate interval is the DC gate mode of operation. A negative signal applied to the DC gate line is directed to the negative OR-INVERT circuit 49 which applies a positive signal to render the AND circuit 33 and AND circuits 34 effective to pass the data on the input lines to the register 37. The active gate interval for this mode of operation will be for the duration of of the DC gate signal.

MANUAL

The forth method of controlling the active gate interval is the manual mode of operation. The active gate interval in this mode of operation is initiated by depressing the manual start push button switch causing a negative signal to be applied to the negative OR-INVERT circuit 20 initiating the start of an active gate interval. The active gate interval may be terminated by again depressing the manual start push button switch if the interval switch is set to the start/start terminal or by depressing the manual push button switch if the interval switch is set to the start/stop terminal. It should be noted that the operation of the interval gate switch to permit the monitor register to respond to a single active gate interval between data transfers or to respond to successive active gate intervals between data transfers as described above in connection with the start/stop mode of operation is equally applicable to the start/start, DC gate and manual modes of operation. Likewise, it should be noted that the operation of the automatic reset on transfer switch to permit reset of the monitor register after each data transfer or the successive accumulation of data until a manual or external reset as described above in connection with the start/stop mode of operation is equally applicable to the start/start, DC gate and manual modes of operation. The operation of the switches associated with monitor register is solely dependent upon the nature of the user's application.

SCALER/TIMER

Figure 9:
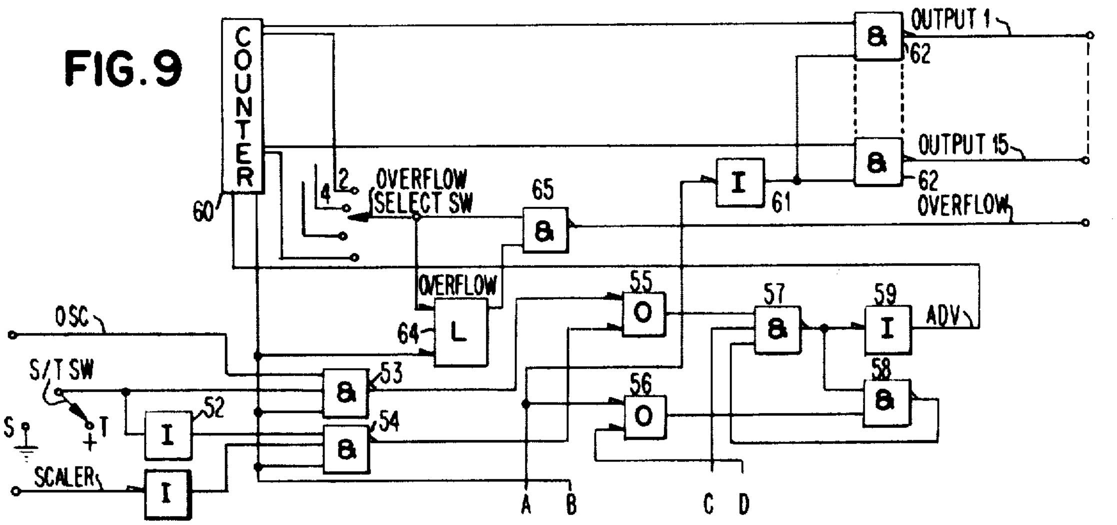
FIG. 9 shows, in symbolic block form, the details of the scaler/timer portion of the block symbol shown in FIG. 8.
Figure 8:
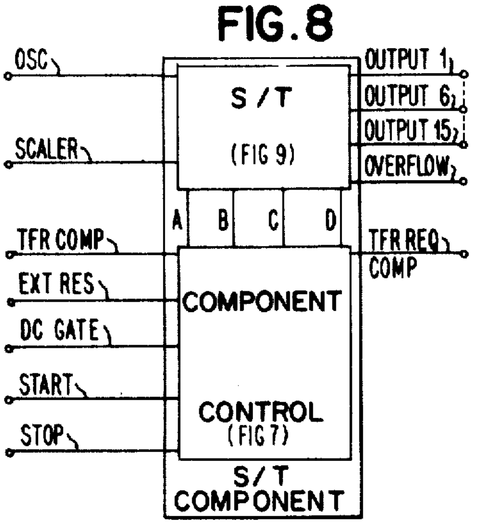
FIG. 8 illustrates the block symbol of a scaler/timer component used in the invention.

Referring to FIG. 8 the scaler/timer component is shown consisting of a scaler/timer shown in FIG. 9 taken together with the component control of FIG. 7. The scaler/timer is basically a binary counter with two modes of operation. One mode is for counting the number of input pulses over a time base determined by external instrumentation. A second mode is for measuring the time interval between start and top signals by counting pulses from a 25 MHz oscillator. The scaler and timer modes are controlled by the active gate intervals which is that time period during which the scaler may count input pulses or that time period during which the timer counts oscillator pulses.

The component control portion of the scaler/timer is identical to that of the monitor register and consequently no detailed description is believed necessary. The component portion of the scaler/timer is connected at terminals A, B, C and D to the corresponding terminals of the component control so that four methods of controlling the active gate interval are provided in the same manner as in the monitor register, namely, the start/stop mode, the start/start mode, the DC gate mode, and the manual mode.

In the start/stop mode, with the interval switch in the start/stop position, an active gate interval is generated from the start signal to the stop signal. In the start/start mode, the active gate interval is generated from the first start signal to the second start signal. In the DC gate mode, a signal applied to the DC gate line generates an active gate interval for the duration of the signal. In the manual mode, an active gate interval is initiated by depressing the manual start push button and may be terminated by depressing either the manual start push button again or the manual stop push button as required by the position of the internal switch.

If it is desired to operate the scaler/timer in the scaler mode, the scaler/timer switch is set to the scaler position causing a negative signal to be applied to decondition the AND-INVERT circuit 53 and via the inverter 52 to apply a positive signal to one input of the AND-INVERT circuit 54. The negative OR circuit 46 of the component control portion of the scaler/timer maintains a positive signal on a second input of the AND-INVERT circuit 54 thereby conditioning the AND circuit to respond to the scaler input signal. Additionally, during the active gate interval, the negative OR-INVERT circuit 49 of the component control portion of the scaler/timer maintains a positive signal at one input terminal of the AND-INVERT circuit 57 and the AND-INVERT circuit 58 which is initially deconditioned maintains a positive signal on a secónd input of the AND-INVERT circuit 57 to thereby condition the AND CIRCUIT 57 in preparation for receiving a scaler input. Upon the occurrence of a positive signal on the scaler input line, the AND-INVERT CIRCUIT 54 is rendered effective to apply a negative signal to the negative OR-INVERT circuit 55 which in turn applies a positive signal to render the AND-INVERT circuit 57 effective to apply a negative signal to the inverter 59. The inverter 59 applies a positive signal via the advance line to advance the count of the binary counter 60. The frequency and duration of the counter advance pulses in this mode are equal to the frequency and duration of the scaler input signal. The input signal can be fed through a discriminator which can be adjusted to establish a threshold voltage for the counter advance signals thereby rejecting any noise that might interfere with the accumulated data. After each scaler input signal, the AND-INVERT circuit 58 is conditioned. Consequently, at the end of the active gate interval, the interval gate flip-flop 50 of the component control portion of the scaler/timer applies a negative signal to render the negative OR-INVERT circuit 56 effective to apply a positive signal to the conditioned AND-INVERT circuit 58 which is rendered effective to apply a negative signal to decondition the AND-INVERT circuit 57 thereby inhibiting further production of the counter advance signals. In the case of the DC gate mode of operation, the termination of the DC gate signal will cause a negative signal to be applied from the negative OR-INVERT circuit 49 to decondition the AND-INVERT circuit 57 and inhibit further production of the counter advance signals.

In the timer mode, the scaler/timer switch is set to the timer (T) position causing a positive signal to be applied to the position AND-INVERT circuit 53 and via the inverter 52 a negative signal to be applied to decondition the AND-INVERT circuit 54. As a result, the counter advance signals are supplied from a precision oscillator and the frequency and duration of the counter advance pulses are thus fixed by the precision of the oscillator.

When the control unit is ready to transfer the content of the binary counter, a negative signal is applied to the transfer component line which is inverted by the inverter 38 to a positive signal and then further inverted by inverter 42 to a negative signal and applied to the negative OR-INVERT circuit 56 and the inverter 61. The inverter 61 inverts the signal to a positive signal to render the positive AND-INVERT circuits 62 effective to transfer the contents of the binary counter 60 to the output lines. As in the monitor register, the negative signal on the transfer component line fires the single shot 39 and initiates a transfer request component signal to initiate the production of the demand to the data processing system to take the data from the output lines via the component interface output data bus after which the transfer component signal is terminated. Upon termination, the AND-INVERT circuits 40 and 41 are rendered effective to fire the single shot 44 and to reset the internal gate 50 via the negative OR-INVERT circuit 47, respectively. The single shot 44 in being fired causes the negative OR circuit 46 to apply a reset signal to reset the binary counter 60 and at the termination thereof to again supply a positive conditioning signal to the AND-INVERT circuits 53 and 54 in preparation for another scaler or timer operation.

An overflow selector switch is provided to permit the operator to choose the count at which an output signal is produced indicating the count has reached the selected modulus. There are six basic applications for the scaler/timer, namely as a scaler, a timer, a frequency divider, a preset counter, a time delay and a scaler/timer extension. In the scaler application, the unit is operated in the scaler mode and will count the number of signals applied to the scaler input line during the active gate interval. In the timer application, the component is operated in the timer mode and the contents of the counter after a measurement represents the number of 40 nanosecond increments counted during the active gate interval. In the frequency divider application, the unit may be operated in either the scaler or timer mode. In the scaler mode the input frequency is divided by the modulus set by the overflow select switch while in the timer mode, the 25 MHz time base frequency is divided by the overflow select modulus. In the preset counter application, the scaler/timer is operated in the scaler mode with the output on the overflow line changing state when the number of input pulses equals the overflow elect modulus. In the time delay application, the component is operated in the timer mode with a fixed time delay produced from the start of the active gate and having an interval which is equal to the overflow select modulus times the 40 nanosecond time base, the end of the time delay period being indicated by the rise of the overflow output signal. In the extension application, for either scaler or timer modes of operation, an additional scaler maybe connected to the overflow output with the first component overflow output being connected to the second component input.

Figure 10:
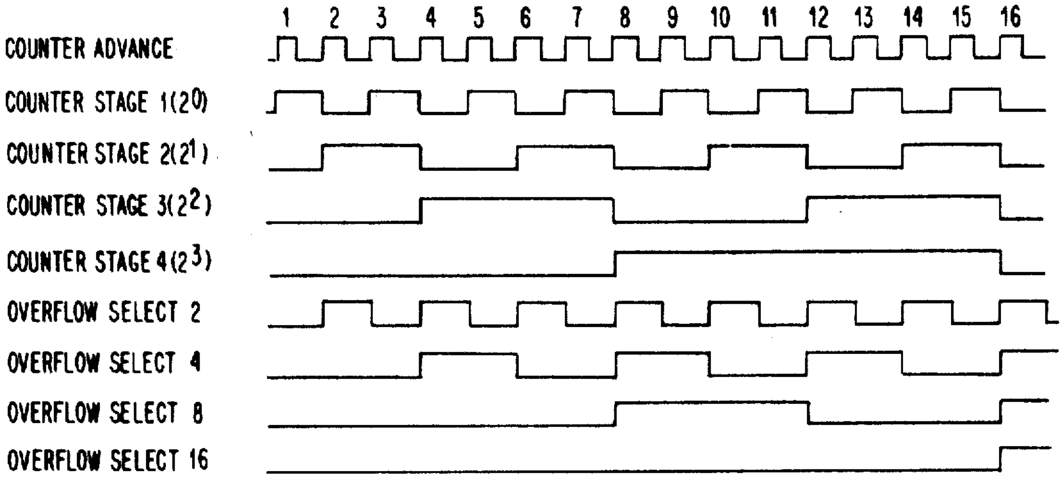
FIG. 10 is a timing diagram of the scaler/timer component operation.

Successive stages of the binary counter 60 are connected to the terminals of the overflow select switch. Thus, stage 1 is connected to the modulus 2 terminal, stage 2 to the modulus 4 terminal, etc. Consequently, assuming modulus of 2 is selected, when the counter 60 reaches a count of 1, the first stage thereof is set and a negative signal is applied via terminal 2 of the overflow select switch to set the overflow latch 64 causing a positive signal to be applied to condition the AND-INVERT circuit 65. When the counter reaches a count of 2, the first stage of the counter 60 is reset causing a positive signal to be applied via terminal 2 of the overflow select switch to render the AND-INVERT circuit 65 effective to apply a negative signal to the overflow line. When the counter reaches a count of 3, the first stage of the counter 60 is again set and a negative signal is applied via terminal 2 of the overflow select switch to decondition the AND-INVERT circuit 65 thereby terminating the positive signal on the overflow line. In a similar manner, the overflow line will change state at successive counts of 4, 5, 6, 7, etc., thereby providing a signal whose frequency is one-half that of the counter advance signal frequency. FIG. 10 shows the relationship between the counter advance signal, the output from the various stages of the binary counter and the output signal on the overflow line for the overflow select modulus of 2, 4, 8, and 16. Reset of the overflow latch 64 is accomplished by the reset signal from the negative OR circuit 46 in he component control of FIG. 7.

ANALOGUE TO DIGITAL CONVERTER

Figure 11:
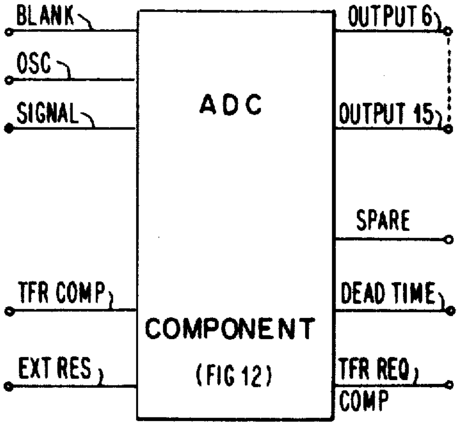
FIG. 11 illustrates the block symbol of an analogue to digital converter component used in the invention.

Referring now to FIG. 11, there is shown the logic block for the Analogue to Digital Converter Component. The ADC is of the ramp type and measures the peak amplitude of an analogue signal and converts this measurement to a 10-bit binary number.

Figure 12:
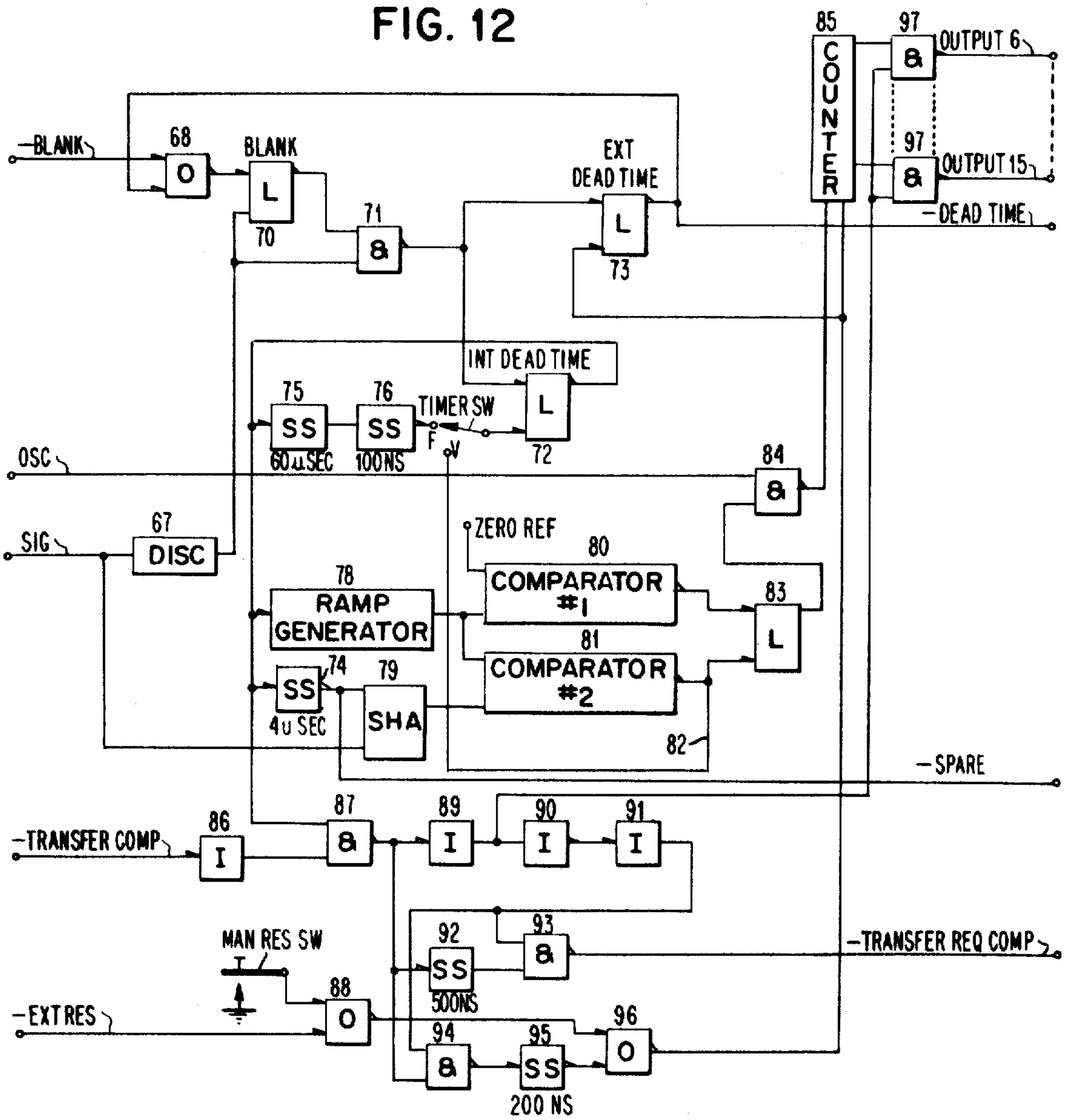
FIG. 12 shows, in symbolic block form, the details of the analogue to digital converter component shown in block symbol form in FIG. 11.

Referring now to FIG. 12, instrumentation may sense an analogue signal and apply it via the signal line to the discriminator 67 and the sample and hold amplifier (SHA) 79. The blank latch 70 is initially in a reset condition causing a positive signal to be applied to condition the AND-INVERT circuit 71. The discriminator 67 generates a positive output signal when the analogue signal exceeds the reference level set by the threshold control of the discriminator. The positive signal output of the discriminator 67 is applied via the conditioned AND-INVERT circuit 71 to turn on the internal dead time latch 72 and the external dead time latch 73. The internal dead time latch 72 in being turned on applies a negative signal to initiate operation of the ramp generator 78 and to fire the the single shots 74 and 75. The external dead time latch 73 in being turned on applies a negative signal to the DEAD TIME line during the entire conversion and can be used as a BLANK signal input to another ADC. The output signal of the single shot 74 is used as a sample signal by the sample and hold amplifier 79 to sample the analogue input signal and may also be used as an external gate control via the SPARE output line while the single shot 75 provides a fixed dead time delay. conversions ADC dead time may be defined as the time allowed for an analogue to digital conversion. Two modes of operation are provided, namely, a Fixed Time Mode and a Variable Mode. In the Fixed Mode, a fixed dead time is provided, the period of which is related to the maximum possible amplitude of the input signal, but once triggered will provide such fixed time regardless of the amplitude of the input signal. In the Varible mode, the period of the dead time is directly proportional to the amplitude of the input signal. The timer switch when set to the position F provides a fixed dead time dependent upon the period of the single shot 75 and when set to the position V provides a variable dead time dependent upon the magnitude of the input signal as reflected by the comparator 81. The external dead time latch 73 in being turned on applies a negative signal to render the negative OR circuit 68 effective to turn on the blank latch 70. The blank latch 70 in being turned on deconditions the AND-INVERT circuit 71 thereby inhibiting any further conversions from being initiated. The ramp generator 78 in being initiated produces a ramp signal which has two functions. First, as the rising ramp signal becomes equal to or greater than the zero reference signal applied to comparator 80, a negative signal is produced to set the latch 83; second, when the ramp signal continues to rise and becomes equal to or greater than the analogue input signal applied via the sample and hold amplifier 79 to the comparator 81, a negative signal is generated to reset the latch 83. The result of this operation is to condition he AND-INVERT circuit 84 for a duration proportional to the amplitude of the input signal. The AND-INVERT circuit 84 when conditioned gates the oscillator signal input to advance the binary counter 85. The output of the counter is therefore a digital representation proportional to the analogue input signal.

When the control unit is ready to sample the ADC, a negative signal is applied to the transfer component line which is inverted to a positive signal by the inverter 86 to condition the AND-INVERT circuit 87. At the expiration of the fixed dead time, the rise of the output signal from the single shot 75 is applied to fire the single shot 76. The single shot 76 produces a negative signal which is applied via the timer switch to reset the internal dead time latch 72. The dead time latch in being reset causes a positive signal to be applied to the conditioned AND-INVERT circuit 87 which is rendered effective to apply a negative signal to the inverter 89 and to fire the single shot 92. The inverter 89 applies a positive signal to render the AND-INVERT circuits 97 effective to apply the content of the binary counter 85 to the output lines. The positive signal output of the inverter 89 is successively inverted by inverters 90 and 91 to apply a positive signal to condition the AND-INVERT circuits 93 and 94. At the end of the period of the single shot 92, a positive shift in potential is applied to render the AND circuit 93 effective to apply a negative signal to the transfer request component line. This signal is used to signal the component interface to make a demand to the data processing system to take the data from the output lines of the ADC and to also initiate the termination of the negative signal on the transfer component line. Upon termination of the negative signal on the transfer component line, a positive signal is again applied via the inverter 86 where it is inverted to a negative signal to decondition the AND-INVERT circuit 87 causing a positive signal to be applied to the conditioned AND-INVERT circuit 94. The AND-INVERT circuit 94 applies a negative signal to fire the single shot 95 which applies a negative signal to render the negative OR circuit 96 effective to apply a negative signal to reset the binary counter 85 and to reset the external dead time latch 73. The external dead time latch 73 in being reset applies a positive signal to decondition the negative OR circuit 68 and to terminate the negative signal on the DEAD TIME line. Under the assumption that no negative signal is present on the blank line, the next analogue signal applied to the signal line will be effective to reset the blank latch 70 which in turn will allow the AND-INVERT circuit 71 to pass the input signal to initiate the next conversion.

It should be noted that the blank latch 70 may be turned on and maintained on by a negative signal applied to the BLANK line. This signal would normally come from the DEAD TIME output of another ADC.

The negative BLANK signal applied to turn on the blank latch 70 does not interfere with a conversion that is in process but prevents further conversions by the ADC until it is removed. Thus, while an ADC may have a conversion in process, if the blank latch of the ADC is turned on by a negative signal applied to the BLANK line from the DEAD TIME output of another ADC, then at the end of the DEAD TIME of the ADC on inhibit of the blank latch would be removed by the resetting of the active latch 73 but so long as the negative signal is maintained on the BLANK line, the blank latch 70 cannot be reset thereby permitting the conditioning of AND-INVERT circuit 71 to respond to further input signals.

Mutual blanking may be achieved by connecting the BLANK inputs and the DEAD TIME outputs of all shared ADC's. Thus, when a conversion is started by one of the ADC's the resulting dead time blocks all of the other ADC's from being started by an input signal until such time as the first ADC has completed its conversion. If two input signals occur at the same time, both of the ADC's associated therewith are initiated. However, any succeeding input signals are ignored because of the mutual dead time. Any further input signals to these two ADC's or any of the others that are mutually blanked will be inhibited until the last of the shared ADC's are no longer busy at which time the mutual dead time expires and any of the ADC's may now respond to another input signal.

6. Detailed Description of a Representative System Application

The Data Acquisition Interface System of the present invention is designed to be modular in concept to enable the user to assemble the hardware in a wide variety of useful configurations depending upon the application and to change the configuration with ease upon completion of a given application. This is accomplished by the provision of plug-in data acquisition components which are plugged into the system by the user in accordance with the application desired. Additionally, the components are logically associated with a given event by means of a plugboard which effectively programs the components to be associated with the event. Thus, the number of useful applications for which the system can be configured is limited only by the imagination and/or needs of the user. While the number of configurations are virtually unlimited, a representative configuration will now be described to show how the different types of data acquisition components may be configured into the system to carry out a particular application. It will be understood that in view of the foregoing specification that numerous other configurations may be made by those skilled in the art without departing from the teaching of of the present invention.

Figure 13:
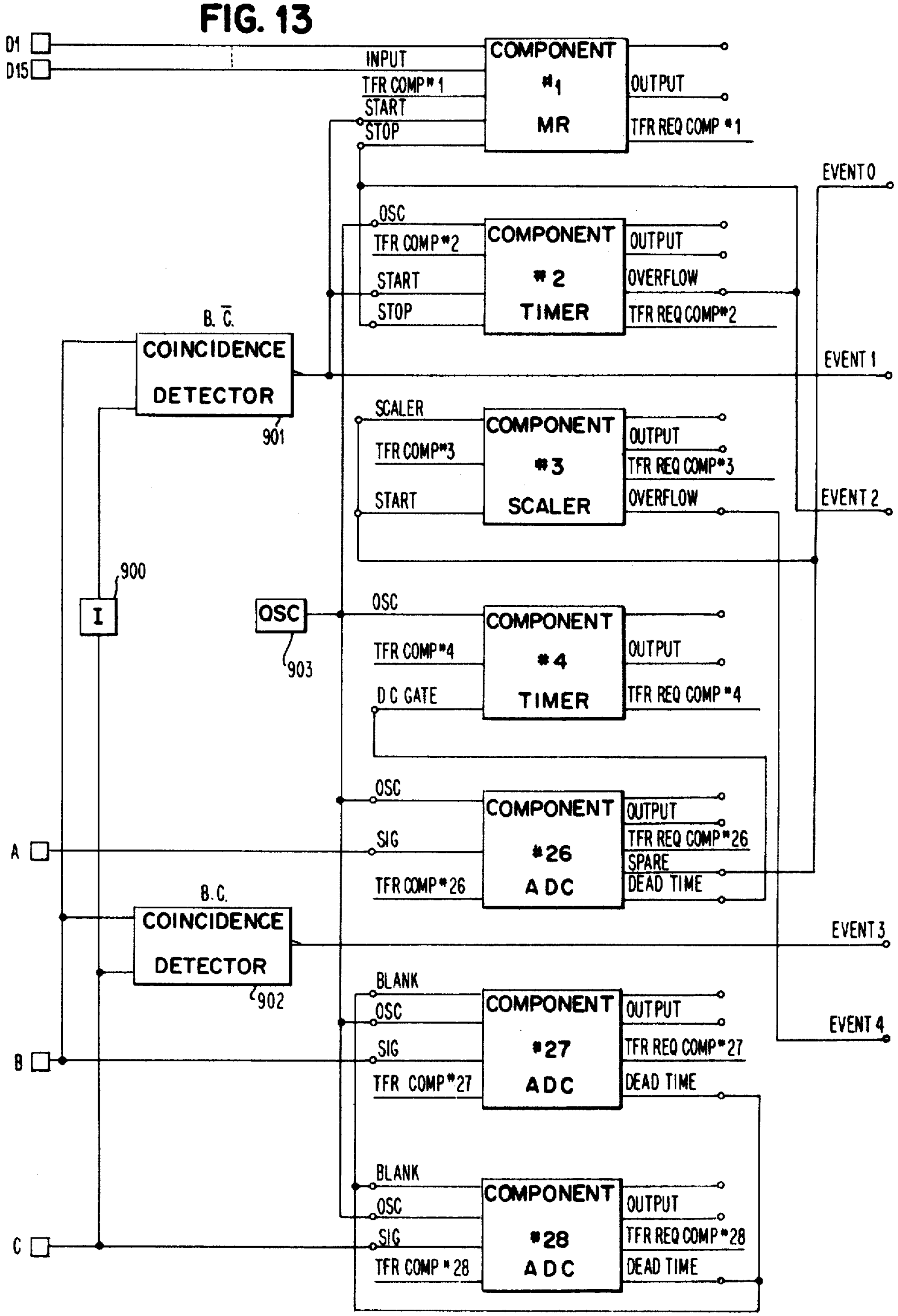
FIG. 13 illustrates in logical block form a representative arrangement of components associated with different events.

Referring now to FIG. 13, there is shown a representative configuration of data acquisition components associated with different events. Before describing the configuration and operation a number of assumptions and requirements will be set forth relative to the application which required his representative configuration.

1. Let it be assumed that the system is to measure three analogue input signals A, B and C each occurring randomly in time and with variable amplitude.
2. Let it further be assumed that the system is to monitor the condition of a group of input lines D1—D15.
3. Let it also be required that the input signals A and B are to be measured with ADC components hereinafter referred to as ADC-A and ADC-B, respectively, operating in a variable dead time mode while input signal C is to be measured with an ADC component hereinafter referred to as ADC-C operating in a fixed dead time mode.
4. Let it further be required that binary data representing the ADC-A measurement be transferred to the data processing system.
5. Let it also be required that binary data representing the ADC-B measurement be transferred to the data processing system upon the time coincidence of either (*a*) the presence of an input B signal and the absence of an input C signal or (*b*) the presence of both the input B and C signals.
6. Let it further be required that binary data representing the ADC-C measurement be transferred to the data processing system only upon the time coincidence of the presence of both the input B and C signals.
7. Let it further be required that the condition of the group of input lines D1—D15 be monitored for a predetermined period of time starting at the time coincidence of the presence of an input B signal and the absence of an input C signal.
8. Let it further be required that binary data representations of the condition of the group of input lines D1—D15 and of the monitoring time, respectively, be transferred to the data processing system after the predetermined monitoring period.
9. Let it further be required that a predetermined number of measurements made by the ADC-A component be counted and the variable dead time period of the ADC-A component be measured for each count.
10. Let it also be required that binary representations of the count and the total variable dead time period be transferred to the data processing system after the predetermined number of measurements are made.

In accordance with the above assumptions and requirements data acquisition components may now be selected and coordinated with events to carry out the requirements of the system application. Care must be taken in coordinating the events and associated components to ensure that desired data is contained in the components at the time of the data transfer operation to the data processing system. The components are provided with controls described above allowing the component to hold its contents after a data measurement and not respond to further signals until data has been transferred to the data processing system. Also, capabilities exist for controlling ADC components to reject signals by use of dead time signals. Further care must be exercised under circumstances where data acquisition components may be shared by events. Accordingly, in the case of shared ADC's, this may be accomplished by (*a*) inserting diode pins in the appropriate plugboard locations of the event exclusion selector thereby inhibiting the system from responding to events which share components with the current event and making the events mutually exclusive and (*b*) mutually blanking all other ADC's in any shared configuration by connection of all dead time outputs to all blank inputs thereby preventing ADC's from responding to signals when the associated event cannot be handled due to excluded events which are currently being processed.

One other parameter of interest is the event dead time which is a system throughput consideration. Event dead time may be defined as the time period from receipt of an event signal to the time the system has completed processing that event and is ready to accept another event signal of the same number. The period from receipt of an event signal to the time it begins the related data transfer is a function of the rate of occurrence of other interfering events, the dead time of those events, the number of components used in the event and if ADC's are used, it becomes further dependent on whether the ADC's are operated in variable or fixed dead time mode and whether the ADC is used as the first or last component in the group of components comprising the event. Event dead time will average less if components other than ADC'are given lower numbered positions thereby permitting their data to be transferred while ADC's are performing conversions with the consequent result being that their transfer time does not contribute to the event dead time. Additionally, event dead time will be less if the ADC's are operated in variable dead time mode and in general with a low usage of other components. Accordingly, in an event configuration which contains several non ADC components assigned to lower numbered positions and several ADC components assigned to the higher numbered positions, the event dead time will be equal to the longest ADC dead time plus a predetermined period for each ADC transfer time on the assumption that all of the non ADC component transfers have been completed before the shortest ADC conversion.

Returning now to FIG. 13 and taking into consideration the requirements of the system application and other considerations set forth above it will be evident that three ADC components will be necessary, two of which will be operated in the variable dead time mode and designated as components 026 and 027 and another which will be operated in the fixed time mode and designated as component 028. Components 026, 027 and 028 may be plugged into the system and used for measuring the input signals A, B and C, respectively. The timer mode switches of components 026 and 027 will be set to the variable dead time position while the timer mode switch of component 028 will be set to the fixed dead time position. Since binary data representing the component 026 measurement of input signal A is to be transferred to the data processing system, a signal on the spare line output of the component 026 signalling a data conversion as been initiated will be used to signal Event 0. Also, since none of the system application requirements require any other condition for data transfer from component 026, this component need not be shared with any other event and no diode pin need be inserted in the column associated with Event 0 of the event exclusion selector 200. Input signal A and the output of oscillator 903 will be connected to the signal and oscillator input lines, respectively, of component 026.

One of the requirements of the system application was that binary data representing the ADC–B measurement be transferred to the data processing system upon the time coincidence of either (*a*) the presence of an input B signal and the absence of an input C signal or (*b*) the presence of both the input B and C signals. Accordingly, these two conditions may be recognized as two separate events to facilitate data processing which accounts for the coincidence conditions. Thus, component 027 which measures the input B signal, will be shared by these two events the first of which may be designated as Event 1. In order to detect the input signal conditions of Event 1, the input B signal and the input C signal inverted by inverter 900 are applied to a coincidence detector 901 which produces a signal upon the coincidence of the presence of an input B signal and the absence of an input C signal. The output of the coincidence detector 901 will thus be used to signal Event 1, and since it is required that binary data representing the component 027 measurement be transferred to the data processing system under this condition, component 027 will be the only component associated with this event. Accordingly, a diode pin will be inserted at position 27 of the column associated with Event 1 in the component and tag selector 400 thereby programming component 027 to be associated with Event 1.

Another one of the requirements of the system application was that a group of input lines D1-D15 be monitored for a predetermined period of time starting at the time coincidence of the presence of an input B signal and the absence of an input C signal. Accordingly, a monitor register will be necessary for monitoring the group of input lines and a scaler/timer, set to the timer mode of operation, will be necessary to measure the predetermined period of time. The monitor register may be designated as component 01 and the scaler/timer as component 02, both of which may be plugged into the system with their interval switches being set for the start stop mode of operation. Since only one reading of the group of input lines D1—D15 is to be made, the interval gate switch and the automatic reset on transfer switch of components 01 and 02 are set to the on position so that only a single active gate interval will occur and the monitor register of component 01 and the counter of component 02 will automatically be reset after the respective data transfers. The output of the coincidence detector 901 may be connected to the start inputs of both components 01 and 02 so that detection of the coincidence condition will start the active gate interval for both components. The overflow select switch of component 02 will be set to a position equal to the predetermined period that it is desired to monitor the group of input lines D1—D15 and the occurrence of the overflow signal will be connected to the stop inputs of both components 01 and 02 to terminate the active gate intervals thereof. At the end of the active gate interval component 01 will contain binary data representing the condition of the group of input lines D1—D15 and component 02 will contain binary data representing the period of time during which the group of input lines was monitored. The overflow signal output of component 02 which terminates the active gate interval of components 01 and 02 may also be used to signal Event 2 and since it is required that the binary data stored in components 01 and 02 be transferred to the data processing system under this condition, components 01 and 02 will be the components associated with this event. Accordingly, diode pins will be inserted at positions 1 and 2 of the column associated with Event 2 in the component and tag selector 400 thereby programming components 01 and 02 to be associated with Event 2.

Another one of the requirements of the system application was that binary data representing the ADC–B and ADC–C measurements be transferred to the data processing system upon the time coincidence of the presence of both the input B and C signals. Accordingly, the input B and C signals are connected to a coincidence detector 902 the output of which is used to signal an event designated as Event 3. Since it is required that binary data representing the component 027 and 028 measurements be transferred to the data processing system under this condition, components 027 and 028 will be the components associated with this Event 3. Therefore, diode pins will be inserted in positions 27 and 28 of the column associated with Event 3 in the component and tag selector 400 thereby programming components 027 and 028 to be associated with Event 3. It will be remembered that component 027 was also used in Event 1 and is therefore a shared component. Since component 027 is shared by Events 1 and 3, mutual exclusion may be accomplished by inserting diode pins in the appropriate columns of the event exclusion selector 200, that is, by inserting a diode pin in position 3 of the column associated with event 1 and a diode pin in position 1 of the column associated with Event 3. Mutual blanking of components 027 and 028 will be necessary and is accomplished by connecting the dead time outputs of the components together and, in turn, to the blank inputs of both of the components. The output of the oscillator 903 will be connected to the oscillator inputs of both components while the input B signal will be connected to the signal input line of component 027 and the input C signal will be connected to the signal input line of component 028.

Another one of the requirements of the system application is that a predetermined number of measurements made by the ADC–A component be counted and the variable time period of the ADC–A component be measured for each count. Accordingly, this will necessitate a scaler/timer component operating in the scaler mode to count the predetermined number of measurements and another scaler timer component operating in the timer mode for measuring the variable time period of the ADC component. Therefore, a scaler/timer with the scaler timer switch set to the scaler position may be plugged in as component 03 and another scaler/timer with the scaler timer switch set to the timer position may be plugged in as component 04. The spare output line of the ADC–A component, namely, component 026 is connected to the start and scaler input lines of component 03. Since a signal on the spare line indicates a conversion has been initiated, the first such signal may be used both to start the active gate interval of component 03 and as the scaler input for the number of conversions carried out by the component 026. Also, since the dead time output of component 026 represents the variable dead time period of that component, it may be connected to the DC gate line of component 04 while the oscillator 903 is connected to the oscillator input line of component 04, thereby allowing a measurement to be made of the variable time period of component 026. Assuming that only two conversions are desired to be measured, then the overflow select switch may be set to 2 and this may be used to signal Event 4.

The interval switch of component 03 will be set to the start/start mode so that upon occurrence of the second signal on the spare output line of component 026 the active gate interval of component 03 will be terminated. Since only one active gate interval of component 03 is to be made, the interval gate switch is set to the on position. Also, since more than one active gate interval of component 04 is to be made, the interval gate switch is set to the off position to permit accumulation of data. The automatic reset on transfer switch of components 03 and 04 are both set to the on position so that the counter contents thereof will automatically be reset after the data transfer therefrom, respectively. The scaler input signal will advance the count of the counter in component 03 and produce the overflow signal, signalling the occurrence of Event 4. Since it is required that the binary data representation of the count and the total variable time period of component 026, as reflected by the contents of component 04, be transferred to the data processing system after the predetermined two measurements have been made, it is evident that components 03 and 04 will be the components associated with Event 4. Therefore, diode pins will be inserted in positions 3 and 4 of the column associated with Event 4 in the component and tag selector 400 thereby programming components 03 and 04 to be associated with this Event 4. The following table summarized the components associated with the different events.

Event 0 = Component 026
Event 1 = Component 027
Event 2 = Components 01 and 02
Event 3 = Components 027 and 028
Event 4 = Components 03 and 04

Having set up the system configuration and operated the appropriate switches in each of the components in accordance with the system application and having set the appropriate diode pins in the event exclusion selector 200 and the component and tag selector 400, the operation of the system configuration may now proceed for the representative example.

7. Detailed Description of System Configuration Operation

Referring now to FIGS. 4*a*—4*e* and FIG. 13, let it be assumed that the data processing system has issued a read ready signal to the interface control unit indicating that it is in condition to receive data. Also let it be assumed that at this time component 026 of the system monitors the occurrence of an input signal. Accordingly, an ADC conversion is initiated by component 026 and further A input signals are rejected until the present conversion and data transfer is completed. The spare output signal from component 026 is applied to signal the occurrence of the Event 0 and to initiate the active gate interval and to count the first conversion of component 026 via the start and scaler inputs, respectively, of component 03. The dead time signal output of component 026 is applied to the DC gate input of component 04 to provide an active gate interval equal to the dead time of the ADC component 026.

The event 0 signal will be applied to turn on the Event 0 trigger in event register 100. Since the system is presently in the quiescent state, the scan control unit 600 maintains a positive signal on the sample event line thereby permitting the setting of the Event 0 trigger condition to be transferred to turn on the Event 0 latch in the event scanner 300. The Event 0 latch in being turned on causes a negative signal to be applied to the select event 0 line and initiates a rippling down through the event scanner to cause a positive signal to be applied via the event outstanding line to the scan control unit 600. The scan control unit 600 will respond to this signal and bring down the sample event signal which is applied back to the event scanner 300 to block all of the event latches from responding to any further settings of the event triggers in the event register 100.

Since a diode pin was placed in position 26 of the column associated with Event 0 in the component and tag selector 400, the component and tag selector 400 responds to the select event 0 signal and causes a positive signal to be applied via the select component 026 line to the component 026 latch in the component scanner 500. Once the event scanner 300 has completed its scan and stabilized and the component selector 400 has completed its selection and stabilized, the scan control unit 600 produces a positive signal on the sample components line to permit setting of the event ID latch and the component 026 latch in the component scanner 500. Let it be assumed that identification of the event is desired, and accordingly, when the event ID latch is set, a negative signal to the inhibit components 1—28 line will ripple through each of the stages of the component scanner deconditioning each stage so that they will be inhibited from signalling the data acquisition component via the transfer component line. The output from the event ID latch will signal an event ID request to the component interface 800 to initiate the transfer of an event ID word from the component interface 800 to the data processing system. Since it was initially assumed that the data processing system has issued a read ready signal that it is in condition to receive data, the component interface 800 responds to the event ID request signal by issuing a demand signal to the data processing system indicating that data, namely, the event ID word is now present on the output bus of the component interface 800. The DPS accepts the event ID word and drops the read ready line for approximately 4 microseconds after which the read ready line is again raised informing the component interface 800 that it is ready to accept the next data word. The component interface 800 also produces a demand signal to the scan control unit 600 to initiate the production of a positive signal on the reset components line which is applied to reset the event ID latch in the component scanner 500. The event ID latch in being reset initiates a ripple down through the component scanner 500 looking for the first set component latch associated with this event, namely, component latch 026. The output of the component 026 latch will now be effective to signal, via the transfer component 026 line, component 026 to transfer data to the data processing system via the component interface 800. However, such data transfer will not occur until the conversion by component 026 is completed.

Now, let it be assumed while component 026 is carrying out the conversion relative to first input signal A that inputs signals B and C concurrently occur. Accordingly, this condition is detected by coincidence detector 902 to signal Event 3. The Event 3 signal will be applied to turn on the Event 3 trigger in event register 100 which, in being turned on, will attempt to turn on the Event 3 latch in the event scanner 300. However, since an event processing is presently in progress, a negative signal is maintained on the sample event line inhibiting the transfer of Event 3 signal from the event register 100 to the event scanner 300 until completion of the current event. However, conversions are initiated by components 027 and 028 and by virtue of the mutual blanking connections of the components, further input signals to either of these components are inhibited until the conversions and data transfers of both components are completed, at which time the mutual dead time expires and either of the components may then respond to another input signal.

Now, let it further be assumed that while component 026 is still carrying out its initial conversion, another input signal A occurs, and since the component is still carrying out the initial conversion it cannot respond to this second input signal and, therefore, such signal is rejected.

Now, let it be assumed that the initial conversion carried out by component 026 is completed permitting the content of the counter in the component to be transferred to the output lines of the component and passed to the output data bus of the component interface 800. Component 026 also now issues a signal, via the transfer request component line, to the component interface 800. The component interface 800, in turn, issues a signal on the demand to DPS line signalling the data processing system that data is now present on the output data bus. the data processing system accepts the data and drops the read ready line for approximately 4 microseconds after which DPS will again raise the read only line indicating to the component interface 800 that it is ready to accept the next word of data. The component interface 800 again issues a demand signal back to the scan control unit 600 to initiate production of another signal on the reset components line which is effective to reset component 026 latch in the component scanner 500. Since component 026 has been serviced and there are no other components associated with this event, a signal is rippled down to the any component selected line indicating that no further component latches remain selected. This signal is applied to the scan control unit 600 to initiate production of the reset event signal to reset the associated event latch, namely, Event 0 latch in the event scanner 300 and in turn the event trigger, namely, Event 0 trigger in the event register 100 thereby terminating the processing of this event. Since no other event latches are presently on, a signal is again rippled through the event scanner to sense this condition and a negative signal is again applied to the event outstanding line which is applied to the scan control unit 600. The scan control unit 600 responds by causing a positive signal to be applied to the sample event line thereby permitting the next group of events to be transferred from the event register 100 to the event scanner 300. In the assumed example, event trigger 3 is on at the present time and this condition will be transferred from the event register 100 to the event scanner 300 to initiate servicing of this event in the manner described above with respect to Event 0. The only difference between this event and the previous one is the fact that there are two components associated with this event, namely, components 027 and 028, as a sequence of which after the first component is serviced the component scanner will next scan down to the next component for servicing before completing the processing of this event.

Now, let it be assumed that after the conversion has been completed by component 027 but before the conversion has been completed by component 028 that input signals A and B simultaneously occur. Input signal A is applied to component 026 which has completed its initial conversion and it accepts this signal and initiates a second data conversion with the spare output signal therefrom being used to signal the occurrence of another Event 0. Input signal B is rejected by virtue of the blanking by the dead time signal of component 028. The spare output signal of component 026 is also used to terminate the active gate interval of component 03 via the start input thereof and via the scaler input to count the second conversion of component 026. Assuming that the overflow select switch of component 03 is set to 2, a signal will now appear at the overflow output of the component 03 to signal on Event 4. Further, the coincidence detector 901 detects the presence of a B signal and the absence of a C signal and produces an output which is used to signal an Event 1 and at the same time is applied to the start inputs of component 01 and 02 initiating the active gate intervals thereof so that the group of inputs lines D1–D15 may be monitored during the active gate interval of component 01 and the monitoring period provided by component 02.

The Event 0, 1 and 3 signals are all applied to the event register 100. Since component 027 is shared by Event 1 and Event 3 and since Event 3 is still in process, a positive signal is applied from the event selector 200 to block the Event 1 trigger from responding to the signal on Event 1 line. Since Events 0 and 4 are mutually exclusive with Event 3, no event exclusion is necessary of these two events and accordingly, the signals on these lines will be permitted to turn on the Events 0 and 4 triggers. It should be noted that while Event 1 is excluded, components 01 and 02 will function to monitor the group of inputs lines for the active gate interval. Accordingly, when the counter of component 02 reaches a count equal to the setting of the overflow switch, a signal will be applied via the overflow output to signal an Event 2 and will also be applied via the stop inputs of components 01 and 02 to terminate the active gate intervals thereof. The Event 2 signal is applied to turn on the Event 2 trigger in the event register 100. The Event 0, Event 2 and Event 4 triggers in being turned will attempt to turn on the corresponding latches in the event scanner 300. However, since an event is presently in process, a negative signal is maintained on the sample event line inhibiting the condition of the Events 0, 2 and 4 triggers from being transferred to the event latches of the event scanner 300 until completion of the current Event 3. After the processing of Event 3 has been completed, the scan control unit 600 will again bring up the sample event line permitting the next group of events, namely, Event 0, Event 2 and Event 4 to be transferred from the event register 100 to the event scanner 300. Event 0, being the lowest numbered event, will have the highest priority and the processing thereof will be initiated prior to that of Events 2 and 4. The processing of this event will be exactly the same as that previously described.

Now, let it be assumed that another input signal B occurs in the absence of input signal C while Event 0 is being processed. Accordingly, this condition is detected by the coincidence detector 901, the output of which signals another Event 1. Since Event 3 has been completed at this time, component 027 is not blanked from responding to this signal. Consequently, the signal appearing on the Event 1 line may be applied to turn on the Event 1 trigger in the event register 100. Additionally, if the event scan priority switch is in the on position in the scan control unit 600, then upon completing the processing of Event 0 which is currently underway, the Event 1 trigger on condition may be transferred to turn on the Event 1 latch so that Event 1 may be processed before Events 2 and 4. The signal on the Event 1 line is also applied to the start inputs of components 01 and 02 to initiate another active gate interval. However, since Event 2 has not been processed yet, the contents of these two components has not been transferred to the data processing system. Consequently, the interval gate flip-flop of both components has not been turned off and is blocking any further monitoring by these components until their contents have been transferred to the DPS as a result of processing Event 2.

Now, let it be assumed that the second conversion carried out by component 026 is completed and the data content thereof has been transferred to the data processing system, that the event scanner 300 has stepped to Event 1 and input signals B and C occur while component 027 is proceeding with its conversion. Component 027 is blanked from responding to the input signal B inasmuch as the component is already carrying out a conversion and by virtue of the mutual blanking of components 027 and 028, component 028 is also blanked from responding to the input signal B. Therefore, both input signals B and C are rejected by the components 027 and 028.

The simultaneous occurrence of input signals B and C is also detected by coincidence detector 902 to signal another Event 3. Since Event 1 is still in process, and component 027 is shared by Event 1 and Event 3, the event exclusion selector 200 will apply a signal to block the Event 3 trigger of the event register 100 from responding to the signal on the event 3 line and, therefore, this event signal is rejected.

Assuming no further input signals occur, the processing of Event 1 proceeds to completion after which Events 2 and 4 are processed and the system returns to the quiescent state awaiting the further occurrence of input signals.

While the invention has been particularly shown and described with reference to a preferred embodiment thereof, it will be understood by those skilled in the art that various changes in form and details may be made therein without departing from the spirit and scope of the invention.

What I claim is:

1. A data handling system for translating input signals which occur randomly in time into usable form for transmission to a data processing system comprising:

means responsive to said input signals for producing control signals indicating the occurrence of predetermined relationships between said system input signals, component means selectively responsive to said input signals and said control signal producing means for producing output data and control signals related to said input signals, and control means monitoring the control signals produced by said control signal producing means and said component means for selectively controlling the transfer of output data signals from said component means to said data processing system in accordance with the occurrence of said control signals.

2. A data handling system according to claim 1 wherein said control means includes means for processing said control signals in a predetermined sequence.

3. A data handling system according to claim 1 wherein said control means includes means for processing concurrently occurring control signals on a predetermined priority basis.

4. A data handling system according to claim 2 wherein said control means includes means for monitoring later occurring control signals while said processing means is processing a current control signal.

5. A data handling system according to claim 4 wherein said control means includes means for transferring said later occurring control signals from said monitoring means to said processing means after processing the current control signal, said processing means processing said later occurring control signals in a predetermined sequence regardless of the order in which such control signals occurred.

6. A data handling system according to claim 2 which includes means for inhibiting said processing means from responding to subsequently occurring control signals while said processing means is processing a current control signal.

7. A data handling system according to claim 2 wherein said control means includes means for monitoring later occurring signals while said processing means is processing a first group of control signals.

8. A data handling system according to claim 7 wherein said control means includes means for transferring said later occurring control signals as a group from said monitoring means to said processing means after said first group of control signals has been processed.

9. A data handling system according to claim 8 wherein said control means includes means for selectively controlling said transferring means to transfer said later occurring group of control signals after processing one of said first group of control signals during which said later occurring group occurred.

10. A data handling system according to claim 9 wherein said processing means processes the remaining ones of said first group and said later occurring group in said predetermined sequence.

11. A data handling system according to claim 2 wherein said control means includes means for monitoring a later occurring control signal while said processing means is processing a first group of control signals, means for transferring said later occurring control signals from said monitoring means to said processing means after said first group of control signals has been processed, and means for selectively controlling said transferring means to transfer said later occurring control signal after processing one of said first group of control signals during which said later occurring control signal occurred, said processing means processing said later occurring event before processing the remaining control signals of said first group which are of lower priority in said predetermined sequence.

12. A data handling system according to claim 1 wherein said control signal producing means includes means producing a control signal indicating the coincident occurrence of predetermined ones of said input signals.

13. A data handling system according to claim 12 wherein said control signal producing means includes means producing a control signal indicating the coincident occurrence of the presence and absence of predetermined ones of said input signals.

14. A data handling system according to claim 1 wherein said component means includes at least a monitor register component for registering the condition of discrete input signal lines, said monitor register component including component control means responsive to said control means for transferring output data signals from said monitor register to said data processing system.

15. A data handling system according to claim 1 wherein said component means includes at least a scaler component containing a counter for counting signals, said scaler component including component control means responsive to said control means for transferring output data signals from said counter to said data processing system.

16. A data handling system according to claim 1 wherein said component means includes means for producing signals at a predetermined frequency, and at least a timer component containing a counter responsive to the signals from said signal producing means for counting time increments as a function of said predetermined frequency, said timer component including component control means responsive to said control means for transferring output data signals from said timer counter to said data processing system.

17. A data handling system in accordance with claim 1 wherein said component means includes means for generating signals, and at least an analogue to digital conversion component containing a counter responsive to said signal generating means during the measurement of an input signal for providing an output data signal as a function of the amplitude of the input signal, said analogue to digital conversion component including component control means responsive to said control means for transferring the output data signals from said conversion counter to said data processing system.

18. A data acquisition system for acquiring data relative to randomly occurring input signals for transmission to a data processing system comprising:

means responsive to said input signals for producing control signals indicating the occurrence of predetermined relationships between said input signals, a plurality of data acquisition components selectively arranged to respond to said input signals and predetermined ones of said control signals for producing output data signals and other control signals indicating the availability of data related to the occurrence of predetermined ones of said input signals, and control means monitoring the control signals produced by said control signal producing means and predetermined ones of said data acquisition components for selectively controlling said plurality of data acquisition components to transfer output data signals as a block of data to said data processing system in accordance with the occurrence of said control signals.

19. A data acquisition system according to claim 18 wherein said control means includes means for transferring data signals identifying each control signal which has occurred prior to the transfer of the data block associated with the occurrence of each said control signal.

20. A data acquisition system according to claim 18 wherein said control means includes means for multiplexing the output data signals from said plurality of data acquisition components to said data processing system.

21. A data acquisition system according to claim 18 wherein said control means includes:

means for storing the occurrence of said control signals, means responsive to said storing means for producing selection signals in a predetermined sequence corresponding to said control signals, and means responsive to said selection signals for producing component selection signals to select said data acquisition components in a predetermined sequence to transfer the output data signals to said data processing system.

22. A data acquisition system according to claim 18 wherein said control means includes:

means for storing the occurrence of said control signals, means responsive to said storing means for producing selection signals in a predetermined sequence corresponding to said control signals, programming means responsive to said selection signals for producing component signals identifying predetermined ones of said plurality of data acquisition components associated with the occurrence of said control signals, and means responsive to said component signals for producing component selection signals to select said data acquisition components in a predetermined sequence to transfer the output data signals to said data processing system.

23. A data acquisition system according to claim 22 wherein said programming means includes means permitting any of said data acquisition components to be associated with any of said control signals.

24. A data acquisition system according to claim 23 wherein said control means includes control exclusion selector means responsive to the occurrence of a control signal for inhibiting said storing means from responding to subsequent control signals which share the data acquisition components associated with said first occurring control signal.

25. A data acquisition system according to claim 18 wherein said plurality of data acquisition components includes means for inhibiting the further operation of said components until the completion of data signal transfer to said data processing system.

26. A data acquisition system according to claim 18 wherein said control means includes:

storage means for storing the occurrence of said control signals, control scanner means for scanning the condition of said storage means to produce control selection signals in a predetermined sequence corresponding to said control signals, means responsive to said selection signals for producing component selection signals to select said data acquisition components in a predetermined sequence to transfer the output data signals to said data processing system.

27. A data acquisition system according to claim 26 wherein said control scanner means includes means responsive to the occurrence of a control selection signal to inhibit said control scanner means from producing control selection signals having a lower rank in said predetermined sequence until the selected data acquisition components have completed the transfer of output data signal to said data processing system.

28. A data acquisition system according to claim 22 wherein said component selection signals producing means includes:

component storage means for storing the occurrence of said component signals, and component scanner means for scanning the condition of said component storage means to produce said component selection signals.

29. A data acquisition system according to claim 28 wherein said component scanner means includes means responsive to the occurrence of a component selection signal to inhibit said component scanner means from producing component selection signals having a lower rank in said predetermined sequence until the selected data acquisition component has completed the transfer of output data signals to said data processing system.

30. A data acquisition system according to claim 26 including:

means responsive to said control selection signals for producing identification data signals corresponding to said control signals, and means for multiplexing the identification data signal followed by the output signals from said selected data acquisition components to said data processing system.

31. A data acquisition system for translating randomly occurring input signals into usable form for transmission to a data processing system comprising:

means responsive to said input signals for producing event signals indicating the occurrence of predetermined relationships between said input signals, a plurality of data acquisition components selectively arranged to respond to said input signals and predetermined ones of said event signals for producing output data signals and other event signals indicating the availability of data related to the occurrence of predetermined ones of said input signals, first storage means for storing indications of the occurrence of said event signals, second storage means, first control means for selectively controlling the transfer of indications stored in said first storage means to said second storage, event scanner means for scanning the condition of said second storage means to produce event selection signals in a predetermined order corresponding to the event signals stored in said second storage means and an event outstanding signal indicating the storage of one or more event signals in said second storage means, said first control means being responsive to the absence of said event outstanding signal to permit the transfer of indications stored in said first storage means to said second storage means and responsive to the presence of said event outstanding signal to inhibit the transfer of indications stored in said first storage means to said second storage means, programming means responsive to event selection signals for producing component identification signals identifying predetermined ones of said plurality of data acquisition components associated with the occurrence of said event signals, third storage means, second control means responsive to occurrence of said event outstanding signal for selectively controlling the transfer of component identification signals to said third storage means, component scanner means for scanning the condition of said third storage means to produce component selection signals to select said data acquisition components in a predetermined order, and means for multiplexing the output data signals from said selected data acquisition components to said data processing system.

32. A data acquisition system according to claim 31 wherein said multiplexing means includes means for producing a control signal corresponding to each output data signal transfer to said data processing system, and third control means responsive to each control signal for controlling said third storage to terminate the storage of the component identification signal corresponding to the data acquisition component whose output data signal is being transferred to said data processing system.

33. A data acquisition system according to claim 32 wherein said component scanner includes means for producing a signal indicating no further component identification signals are stored in said third storage means, and fourth control means responsive to said indicating signal for controlling said second storage means to terminate the storage of the event signal corresponding to the data acquisition components associated with the event which have completed the transfer of output data signals to said data processing system.